US009524275B2

(12) United States Patent
Sampathkumar et al.

(10) Patent No.: US 9,524,275 B2
(45) Date of Patent: Dec. 20, 2016

(54) SELECTIVELY TRANSLATING SPECIFIED DOCUMENT PORTIONS

(71) Applicant: Microsoft Technology Licensing, LLC, Redmond, WA (US)

(72) Inventors: Nithyalakshmi Sampathkumar, Bellevue, WA (US); Matthew J. Warren, Redmond, WA (US); Martin Maly, Redmond, WA (US); Mark W. Fussell, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 633 days.

(21) Appl. No.: 13/865,485

(22) Filed: Apr. 18, 2013

(65) Prior Publication Data

US 2013/0232406 A1 Sep. 5, 2013

Related U.S. Application Data

(60) Continuation of application No. 11/005,802, filed on Dec. 7, 2004, now abandoned, which is a division of
(Continued)

(51) Int. Cl.
*G06F 17/22* (2006.01)
*G06F 17/21* (2006.01)
(Continued)

(52) U.S. Cl.
CPC .......... *G06F 17/218* (2013.01); *G06F 17/227* (2013.01); *G06F 17/2247* (2013.01); *G06F 8/4434* (2013.01); *G06F 17/30625* (2013.01)

(58) Field of Classification Search
CPC .. G06F 17/2247; G06F 17/218; G06F 17/227; G06F 8/4434; G06F 17/30625
See application file for complete search history.

(56) References Cited

U.S. PATENT DOCUMENTS 6,085,203 A * 7/2000 Ahlers ................. G06F 7/768
709/246
6,209,124 B1 3/2001 Vermeire et al.
(Continued)

OTHER PUBLICATIONS

XML Path Language (XPath) Version 1.0. W3C, http://www.w3.org/TR/REC-xpath-19991116.html, 1999. 49 pages.
(Continued)

*Primary Examiner* — Maikhanh Nguyen
(74) *Attorney, Agent, or Firm* — Nicholas Chen; Kate Drakos; Micky Minhas

(57) ABSTRACT

Methods, systems and computer program products are provided for selectively translating documents. For example, a computer system may be provided that selectively loads a specified portion of a document in a meta-markup language into system memory. Portions of the document that are not specified remain unloaded into the system memory. Once the specified portions of the document have been loaded into memory, the computer system translates the selectively loaded portion of the document from one format to another format. Translated portions of the document may then be provided, in some cases, to entities such as users, software applications or data stores. At least some portions of the document that were not specified or selected for loading into memory remain untranslated and unloaded into system memory. As such, unnecessary loading and translating of unspecified portions of the document is avoided.

18 Claims, 22 Drawing Sheets

Related U.S. Application Data application No. 09/901,368, filed on Jul. 9, 2001, now abandoned.

(51) Int. Cl.
*G06F 17/30* (2006.01)
*G06F 9/45* (2006.01)

(56) References Cited

U.S. PATENT DOCUMENTS

| | | | |
|---|---|---|---|
| 6,256,678 B1 | 7/2001 | Traughber et al. | |
| 6,339,841 B1* | 1/2002 | Merrick | G06F 9/44521 |
| | | | 707/999.103 |
| 6,378,126 B2* | 4/2002 | Tang | G06F 8/41 |
| | | | 717/143 |
| 6,418,446 B1* | 7/2002 | Lection | G06F 17/30896 |
| 6,418,448 B1 | 7/2002 | Sarkar | |
| 6,463,442 B1 | 10/2002 | Bent et al. | |
| 6,542,911 B2* | 4/2003 | Chakraborty | G06F 12/123 |
| 6,571,253 B1 | 5/2003 | Thompson et al. | |
| 6,772,413 B2 | 8/2004 | Kuznetsov | |
| 6,799,299 B1* | 9/2004 | Li | G06F 17/2247 |
| | | | 715/235 |
| 6,938,204 B1* | 8/2005 | Hind | G06F 17/30908 |
| | | | 707/999.101 |
| 6,941,511 B1* | 9/2005 | Hind | G06F 17/2205 |
| | | | 707/E17.006 |
| 7,013,425 B2* | 3/2006 | Kataoka | G06F 17/2247 |
| | | | 715/242 |
| 7,188,169 B2* | 3/2007 | Buus | G06Q 30/02 |
| | | | 709/201 |
| 7,210,097 B1* | 4/2007 | Clarke | G06F 17/30917 |
| | | | 707/999.202 |
| 7,308,474 B2* | 12/2007 | Chandrasekar | G06F 17/30917 |
| | | | 707/E17.005 |
| 7,480,856 B2* | 1/2009 | Jones | G06F 17/3092 |
| | | | 707/E17.126 |
| 7,873,663 B2* | 1/2011 | Willis | G06F 17/2247 |
| | | | 707/758 |
| 2001/0037294 A1 | 11/2001 | Freishtat et al. | |
| 2002/0004830 A1 | 1/2002 | Hyatt et al. | |
| 2002/0021307 A1 | 2/2002 | Glenn et al. | |
| 2002/0049782 A1 | 4/2002 | Herzenberg et al. | |
| 2002/0052824 A1 | 5/2002 | Mahanti et al. | |
| 2002/0055928 A1 | 5/2002 | Worthington | |
| 2002/0056025 A1* | 5/2002 | Qiu | G06F 12/122 |
| | | | 711/133 |
| 2002/0077930 A1 | 6/2002 | Trubey et al. | |
| 2002/0099578 A1 | 7/2002 | Eicher, Jr. et al. | |
| 2002/0103886 A1 | 8/2002 | Rawson, III | |
| 2002/0107881 A1 | 8/2002 | Patel | |
| 2002/0133497 A1 | 9/2002 | Draper et al. | |
| 2002/0138582 A1 | 9/2002 | Chandra et al. | |
| 2002/0157023 A1 | 10/2002 | Callahan et al. | |
| 2002/0169679 A1 | 11/2002 | Neumayer | |
| 2002/0174147 A1 | 11/2002 | Wang et al. | |
| 2003/0005001 A1* | 1/2003 | Kataoka | G06F 17/2247 |
| | | | 715/234 |
| 2003/0018660 A1 | 1/2003 | Martin et al. | |
| 2003/0023628 A1 | 1/2003 | Girardot et al. | |
| 2003/0051236 A1 | 3/2003 | Pace et al. | |
| 2003/0074206 A1 | 4/2003 | Hoffman et al. | |
| 2003/0084120 A1 | 5/2003 | Egli | |
| 2003/0126136 A1 | 7/2003 | Omoigui | |
| 2003/0149934 A1* | 8/2003 | Worden | G06F 17/3056 |
| | | | 715/239 |
| 2004/0015889 A1 | 1/2004 | Todd et al. | |
| 2004/0015890 A1* | 1/2004 | Wong | G06F 17/30076 |
| | | | 717/137 |
| 2004/0015891 A1 | 1/2004 | Arellano-Payne et al. | |
| 2004/0034830 A1* | 2/2004 | Fuchs | G06F 17/2258 |
| | | | 715/234 |
| 2004/0205549 A1 | 10/2004 | Yassin et al. | |
| 2004/0205562 A1* | 10/2004 | Rozek | G06F 17/2247 |
| | | | 715/239 |
| 2004/0205731 A1 | 10/2004 | Junkermann | |
| 2004/0268249 A1* | 12/2004 | Fennelly | G06F 17/30569 |
| | | | 715/236 |
| 2005/0022115 A1 | 1/2005 | Baumgartner et al. | |
| 2005/0198042 A1 | 9/2005 | Davis | |
| 2005/0273475 A1 | 12/2005 | Herzenberg et al. | |
| 2006/0179003 A1 | 8/2006 | Steele et al. | |
| 2007/0174842 A1 | 7/2007 | Cheung | |

OTHER PUBLICATIONS

XSL Transformations (XSLT) Version 1.0. W3C, http://www.w3.org/TR/XSLT, 1999. 123 pages.

Ado.net; Matjaz Klancar in Dejan Sarka; Kopenhagen; Mar. 6-8, 2001 <http://sql.reproms.si/data%5CMatjazk%5Cado.net.ppt>.

Glushko, R., et al., An XML Framework for Agent-Based E-Commerce, Communications of the ACM, vol. 42, No. 3, Mar. 1999, p. 106-114.

Office Action dated Feb. 28, 2005 cited in U.S. Appl. No. 09/901,368.

Office Action dated Aug. 2, 2005 cited in U.S. Appl. No. 09/901,368.

Office Action dated Jan. 24, 2006 cited in U.S. Appl. No. 09/901,368.

Office Action dated Jul. 18, 2006 cited in U.S. Appl. No. 09/901,368.

Office Action dated Oct. 27, 2006 cited in U.S. Appl. No. 09/901,368.

Office Action dated Apr. 17, 2007 cited in U.S. Appl. No. 09/901,368.

Office Action dated Oct. 31, 2007 cited in U.S. Appl. No. 09/901,368.

Office Action dated May 1, 2008 cited in U.S. Appl. No. 09/901,368.

Office Action dated Apr. 6, 2009 cited in U.S. Appl. No. 11/005,802.

Office Action dated Dec. 14, 2009 cited in U.S. Appl. No. 11/005,802.

Office Action dated Feb. 7, 2009 cited in U.S. Appl. No. 11/005,802.

Popov, Dennis V., Using XML as the Core Language of Knowledge Representation in Artificial Intelligence, Proceedings of the 2nd International Workshop on Computer Science and Information Technologies, CSIT'2000, Ufa, Russia, 2000.

Office Action dated Oct. 18, 2012 cited in U.S. Appl. No. 11/005,802.

* cited by examiner

```xml
<contents>
  <fsnav_x005C_bin path="fsnav\bin\"
    compressedSize="0" uncompressedSize="0"
    lastModified="05/30/01 14:22:40" />
  <aaronsziputilslib.dll
    path="fsnav\bin\AARONSZIPUTILSLib.dll"
    compressedSize="1492" uncompressedSize="4096"
    lastModified="05/30/01 14:22:34" />
  <developmentor.xml.dll
    path="fsnav\bin\Developmentor.Xml.dll"
    compressedSize="18595" uncompressedSize="57344"
    lastModified="05/30/01 14:22:38" />
  <fsnav.exe path="fsnav\bin\fsnav.exe"
    compressedSize="2749" uncompressedSize="8704"
    lastModified="05/30/01 14:22:40" />
  <fsnav.pdb path="fsnav\bin\fsnav.pdb"
    compressedSize="1461" uncompressedSize="13824"
    lastModified="05/30/01 14:22:40" />
  <fsnav.cs path="fsnav\fsnav.cs"
    compressedSize="1362" uncompressedSize="5284"
    lastModified="05/23/01 14:18:40" />
  <makefile path="fsnav\makefile"
    compressedSize="417" uncompressedSize="929"
    lastModified="05/23/01 14:37:32" />
  <fsnav path="fsnav\"
    compressedSize="0" uncompressedSize="0"
    lastModified="05/30/01 14:22:38" />
</contents>
```

SELECTIVELY TRANSLATING SPECIFIED DOCUMENT PORTIONS

CROSS REFERENCE

This application claims priority to and is a continuation of co-pending U.S. patent application Ser. No. 11/005,802, filed on Dec. 7, 2004, entitled "XSL TRANSFORM", which itself is a divisional application of U.S. patent application Ser. No. 09/901,368, filed Jul. 9, 2001, entitled "XSL TRANSFORM". Both applications are incorporated by reference herein in their entirety.

TECHNICAL FIELD

The present invention relates generally to transforming data from one format to another format.

BACKGROUND OF THE INVENTION

As XML (extensible Markup Language) has become more widely accepted, increasing amounts of XML data have been generated and employed to store an ever-increasing variety of data. With such a variety of data being generated, a correspondingly wide variety of presentation formats have been employed to view the XML data and a correspondingly wide variety of uses have been found for such XML data. XML is a W3C (World Wide Web Consortium) endorsed standard for document marking that provides a generic syntax to mark up data with human-readable tags. Since XML does not have a fixed set of tags and elements, but rather allows users to define such tags, (so long as they conform to XML syntax), XML can be considered a meta-markup language for text documents.

Data is stored in XML documents as strings of text that are surrounded by text markup. A particular unit of data and markup is conventionally referred to as an element. XML defines the syntax for the markup. A simple XML document appears below:

```
<?xml version="1.0"?>
<programmer grade="G7">
<firstname> ashton </firstname>
<lastname> annie </lastname>
<language> C </language>
<language> C# </language>
</programmer>
```

In this document, the name "ashton" is data (a.k.a. content), and the tags <firstname> and </firstname> are markup associated with that content. The example document is text and can be edited by conventional text editors and stored in locations including, but not limited to, a text file, a collection of text files, a database record and in memory.

XML documents can be treated as trees comprising a root node and one or more leaf nodes. In the example document, the root element is the programmer element. Furthermore, elements can contain parent elements and child elements. In the example document, the programmer element is a parent element that has four child elements: a firstname element, a lastname element, and two language elements. In the example document, the programmer element also has an attribute "grade". An attribute is a name/value pair that is associated with the start tag of an element. XML documents can contain XML entities including elements, tags, character data, attributes, entity references, CDATA sections, comments, processing instructions, and so on.

The W3C has codified XML's abstract data model in a specification called the XML Information Set (Infoset). The Infoset describes the logical structure of an XML document in terms of nodes (a.k.a. "information items") that have properties. Nodes in an XML tree have well-defined sets of properties that can be exposed. For example, an element node has properties including, but not limited to, a namespace name, a local name, a prefix, an unordered set of attributes, and an order list of children. The abstract description of an XML document standardizes information that is made available concerning XML documents. Thus, in addition to data that may be stored in an XML node, metadata concerning the node and the tree in which the node resides is available.

Programs that try to understand the contents of document like the sample XML document employ an XML parser to separate the document into individual XML tokens, elements, attributes and so on. As the document is parsed, it can be checked to determine whether it is well-formed (conforms to the XML specification) and to determine whether it is valid (conforms to a desired DTD (Document Type Definition) and/or schema). A DTD includes a list of elements, attributes and entities that an XML document can employ and the contexts in which they may be employed. XML schemas are scheduled to replace DTDs as an approved W3C standard and thus, in this document, when reference is made to a DTD, an XML schema should also be considered. Thus, a DTD (and/or XML schema) facilitates limiting the form of an XML document. A DTD (and/or XML schema) can be located within an XML document, or an external reference to the DTD (and/or XML schema) can be employed to locate the DTD (and/or XML schema) with which an XML document is related. External references are common since it may be desirable to have more than one XML document conform to one DTD (and/or XML schema).

With XML being employed to store data for such a variety of applications, transforming XML from one format to another format is common. While the markup in an XML document can describe the structure of the document, the XML markup typically does not describe how the document is to be presented. Thus the Extensible Stylesheet Language (XSL) was developed. XSL has subsequently been divided into XSL Transformations (Xslt) and other components.

Xslt is a general-purpose language employed to facilitate transforming an XML document from one form to another form (e.g., from XML to XHTML, XSL-FO, PostScript, RTF, etc.). Xslt employs the XPath syntax to identify matching elements. XPath is a query language for XML that facilitates selecting XML nodes from an XML tree. Conventionally, data is not stored in a manner that facilitates XPath querying. XPath can be employed to locate nodes by identifiers including position, relative position, type, content and the like. Thus, XPath can be employed to pick nodes and/or sets of nodes out of an XML node tree. There are at least seven types of nodes in an XML document that XPath addresses. These node types include a root node type, an element node type, an attribute node type, a text node type, a comment node type, a processing instruction node type and a namespace node type.

Conventionally, transformers depended on an XML document being fully loaded into memory before transformation. Furthermore, conventional transformers typically converted then wrote the entire transformed output before returning control to the requesting user. For example, transforming XML data from one format to another format has conventionally been achieved by copying an XML document into a node tree (e.g., DOM (Document Object Model)), pushing one hundred percent of the node tree into a transformer that transforms one hundred percent of the node tree and then pushes the entire transformed node tree to the output destination that desired the transformed file. Such all or nothing models suffer from several drawbacks, including, but not limited to, extra copy steps, the requirement to produce a node tree before transformation can be performed, transforming unneeded data, consuming excessive memory, consuming excessive processor cycles and limiting the flexibility with which the output destination can request transformations.

Xslt is an XML application that determines, via a set of rules, how one XML document should be transformed into another XML document. An Xslt document (e.g., an Xslt style-sheet) contains a list of templates that are employed in node matching. An Xslt processor can be employed to read the Xslt document and the XML document, and when a pattern match occurs between the input data and the stored template the output associated with the template is pushed out of the Xslt processor. The output can be, for example, written into an output tree (e.g., DOM). Thus, conventional Xslt processors typically interact with event driven user programs that receive event notifications from the Xslt processor along with a set of data concerning the event. One drawback with such conventional systems is that such event notifications may require unnecessary processing by a user program that may only be interested in a subset of events. Furthermore, user programs that interact with such event producing Xslt processors may be required to maintain complicated state machines in order to interact with the conventional Xslt processor.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Embodiments described herein include methods, systems and computer program products for selectively translating documents. For example, a computer system may be provided that selectively loads a specified portion of a document in a meta-markup language into system memory. Portions of the document that are not specified remain unloaded into the system memory. The document may be an XML document or other type of document. Once the specified portions of the document have been loaded into memory, the computer system translates the selectively loaded portion of the document from one format to another format. In cases where an XML document is used, an extensible stylesheet language (XSL) transform may be used to perform the translation. Translated portions of the document may then be provided, in some cases, to entities such as users, software applications or data stores. At least some portions of the document that were not specified or selected for loading into memory remain untranslated and unloaded into the system memory. As such, unnecessary loading and translating of unspecified portions of the document is avoided.

Embodiments described herein further provide a system and method for providing a streaming input and streaming output, incremental XML transformer. Such a streaming XML transformer can be employed in push and/or pull model processing. The transformer facilitates a user incrementally building the output from XML data so that only a subset of an XML document needs to be loaded into memory to perform a selective transformation. Furthermore, the transformer facilitates interacting with a user program that can selectively pull a subset of the transformed XML rather than being pushed substantially all the data associated with events. Thus, a user program employing the pull model can receive less data than if interacting with a conventional system.

The transformer can load XML items stored in a variety of representations from a variety of data stores and transform a subset of such XML items from a first format to one or more second formats. Furthermore, the transformer can send its output to a variety of output destinations via a variety of output models including, but not limited to, writing objects (e.g., XmlWriter, TextWriter) and reading objects (e.g., XmlReader) for pull and/or push based output. The system also facilitates resolving external references (via, for example, the XmlResolver class) in the style sheets that are input to the transformer.

The transformer can perform its transformation functions without requiring that the XML document from which the XML items are taken is converted into a node tree before the XML items can be transformed. Thus, problems associated with memory requirements and unnecessary copying are mitigated since less copying and conversion is required to interact with the transformer on the input and/or output side.

The transformer associated with the present invention facilitates moving a virtual node over a stream of XML data. Such streaming provides advantages over conventional systems. By way of illustration and not limitation, if a user does not desire to receive certain nodes in an input stream, then the virtual node can pass over such nodes without presenting them for transformation and/or for output. Thus, the transformer and/or user program can interact with less data. By way of further illustration, if a user does not desire the entire results of a transform, but desires to stop receiving transformed data when a certain point in the output is reached, the streaming model facilitates such early stopping. By way of still further illustration, if a user desires to employ a pipeline architecture, where partial results from the transformer are fed forward to other components as they are received, which facilitates multiprocessing in a transformation environment, the streaming model facilitates such pipelining. To facilitate such pipelining, a user can employ a pull model API (application programming interface) based, for example, on a reader object (e.g., XmlReader). An XmlReader represents a reader that provides fast, non-cached forward only access to XML data. To support such pull model output, instructions in a style sheet that can generate output and which can be employed with the present invention are split into one or more states that can be employed by a state machine and an event processor to support the pull model API. The state information can have data including, but not limited to, a position in a transformation, a current node being transformed, a style sheet location, and the like.

To facilitate accepting XML items stored in a variety of representations, an input abstracter is provided. The input abstracter models the Infoset as a traversable tree of nodes. The input abstracter can be implemented by data stores that desire to employ the stream-oriented transformer. Implementing the input abstracter facilitates treating XML items stored in a variety of representations as though they were stored in a standard representation, which addresses the problem in conventional systems that require data store contents to first be converted to a node tree (e.g., DOM) before being transformed. Furthermore, implementing the input abstractor facilitates pulling data incrementally from a data store, mitigating memory and load time problems associated with all or nothing push model systems that load an entire node tree. The input abstractor provides an interface that can be employed to navigate data and thus abstracts a reference to a node within an XPath document.

One example input abstractor can also provide an API that exposes a data model and Infoset as defined in the W3C (World Wide Web Consortium) for the XPath 1.0 specification. Advantages gained by employing such an API can be increased when the API is employed in conjunction with an optimized data store (e.g., XPathDocument) that can be employed to store XML in a manner that facilitates minimizing query (e.g., XPath) processing time. One example of the optimized data store represents data in a manner consistent with the XPath data model as defined in the W3C XPath specification. Traditionally XPath and Xslt are applied over a DOM. However, when a user wants to query over non-XML data (e.g., a file system), the user is still constrained to writing functions to load such non-XML data into a DOM, then performing XPath and Xslt on the entire document. The input abstractor provides an API that a user can implement over a variety of data stores (e.g., documents, file system, registry), where the API provides a cursor style model that removes the requirement that the entire file be loaded into memory before transformation.

The present invention also includes a node selection abstractor that can be employed to dynamically construct a subset of input XML items from a set of input XML items. The subset of input XML items are related items that are responsive to a query (e.g., XPath). Being able to dynamically construct a subset of input XML items that are responsive to a query facilitates mitigating problems associated with pre-computing node tree requirements for conventional queries. The node selection abstractor further facilitates loading relevant data into memory as the transformer needs such relevant data, which results in saving memory and loading time. Furthermore, the node selection abstractor abstracts patterns of traversal over a document, a document subset or a selection, which facilitates navigating in a document.

Conventionally, Xslt processors (transformers) and XPath engines (query engines) are implemented in one integrated system. But the present invention facilitates separating the Xslt processor from the XPath engine, providing flexibility advantages over conventional systems. For example, if a user determines that optimizations (e.g., hardware, software) are available for a generic transformer, then having a separate Xslt processor component simplifies implementing such optimizations.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

FIG. 22 is sample code illustrating the corresponding XML format exposed by a sample input abstractor associated with FIG. 21.

DETAILED DESCRIPTION OF THE INVENTION

Figure 1:
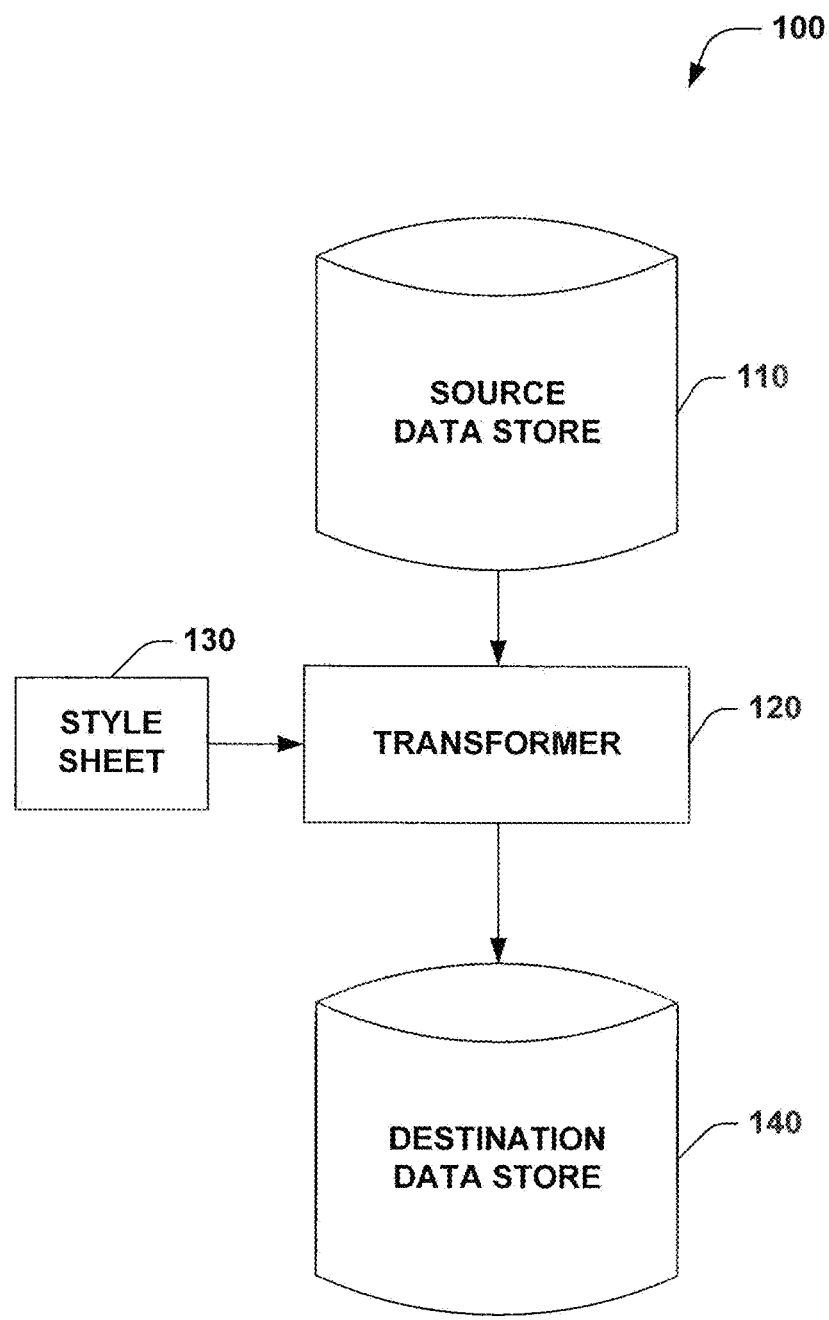
FIG. 1 is a schematic block diagram illustrating a system for transforming XML items from one representation to another, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component.

Concerning interfaces, classes not related by inheritance can, nevertheless, share common functionality. For example, many classes can contain methods for saving their state to and from permanent storage. For this purpose, classes not related by inheritance can support interfaces allowing programmers to code for the classes' shared behavior based on their shared interface type and not their exact types. Thus, as used in this application, the term "interface" refers to a partial specification of a type. It is a contract that binds implementers to provide implementations of the methods contained in the interface. Object types can support many interface types, and many different object types would normally support an interface type. By definition, an interface type can never be an object type or an event type. Interfaces can extend other interface types. Thus, an interface can contain methods (both class and instance), static fields, properties and events. However, unlike an object, an interface cannot obtain instance fields.

It is to be appreciated that various aspects of the present invention can employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks can be employed.

Referring initially to FIG. 1, a system 100 for transforming XML items from one representation to another is illustrated. The system 100 includes a transformer 120 that is adapted to accept XML items from a data source 110 and to apply one or more transformation instructions from a style sheet 130 to the XML items and produce transformed XML items that can be output to a destination data store 140.

Conventionally, XML transformation systems are pushed one hundred percent of the XML items in the source data store 110, transform one hundred percent of the XML items and then push one hundred percent of the transformed XML items to the destination data store 140. The present invention facilitates the transformer 120 receiving a subset of the XML items from the source data store 110, by, for example, selectively pulling nodes from the source data store 110. The present invention further facilitates the transformer 120 transforming a subset of the XML items, which can contribute to time and/or memory savings when compared to conventional systems. Further still, the present invention facilitates the transformer 120 making a subset of the transformed XML items available to be pushed and/or pulled to the destination data source 140. Thus, problems associated with conventional systems (e.g., excessive copying, excessive transformation, excessive output) are mitigated.

Figure 2:
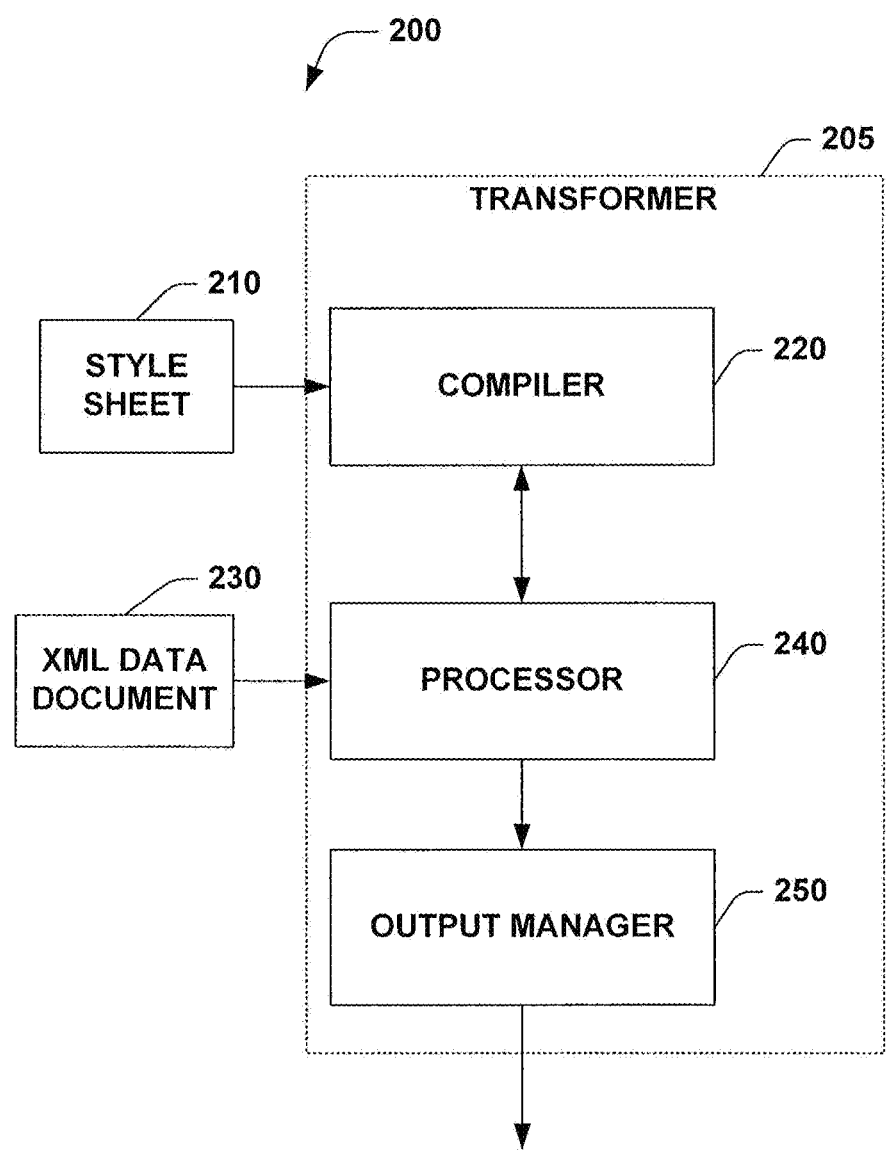
FIG. 2 is a schematic block diagram of an exemplary transformer and its component parts, in accordance with an aspect of the present invention.

FIG. 2 is a schematic block diagram of a transformer 205. The transformer 205 includes a compiler 220, a processor 240 and an output manager 250. The compiler 220 accepts data from an XSL style sheet 210 and compiles the data into one or more actions. The actions are employed by the processor 240 to transform an XML data document 230. The processor 240 provides the transformed XML data to the output manager 250, which facilitates implementing various output models (e.g., stream, push, pull). The output manager 250 builds the transformed XML data into an output XML data document.

One example compiler 220 employs an XsltTransform class and a classic recursive descent routine to parse and store information from an Xsl style sheet 210. This involves storing templates and their actions in a compiled style sheet, storing potential queries, and preparing a root action for execution. Style sheet compilation will be examined further in connection with FIGS. 10 through 13.

Figure 3:
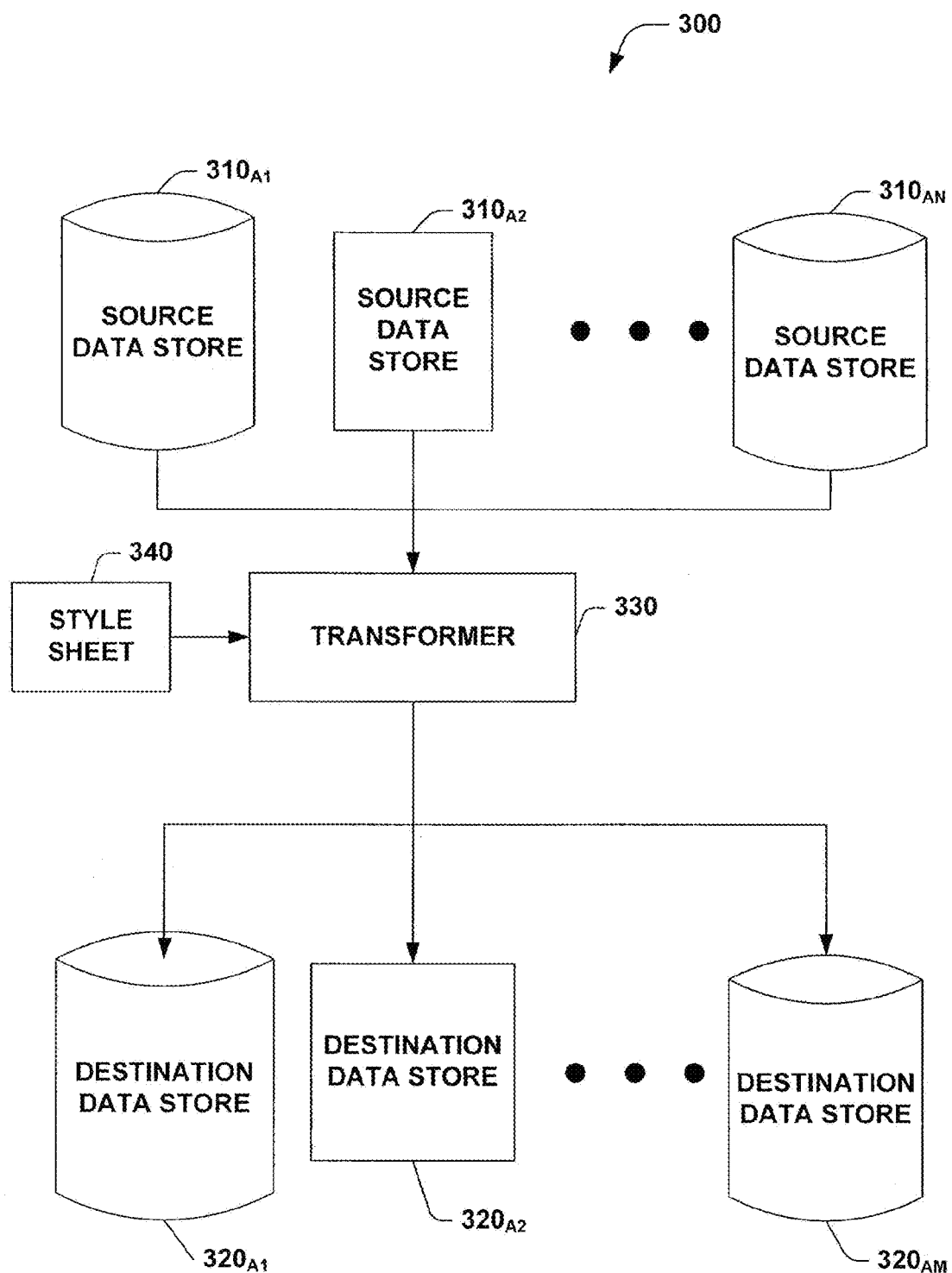
FIG. 3 is a schematic block diagram of a transformer receiving input from a variety of sources and providing output to a variety of sources, in accordance with an aspect of the present invention.

Turning now to FIG. 3, a system 300 illustrates a transformer 330 receiving XML input items from multiple input sources and making transformed XML items available to multiple destination sources. In the system 300, the transformer 330 can apply one or more transformation instructions from a style sheet 340 to the XML input items.

The transformer 330 can, for example, receive XML input items from a first data store $310_{A1}$ (e.g., a database) and a second data store $310_{A2}$ (e.g., a file) through an Nth data store $310_{AN}$ (N being an integer) (e.g., a registry) (collectively the data sources 310). Furthermore, the transformer 330 can selectively receive the XML input items from the data sources 310. For example, rather than one hundred percent of the XML items in the data sources 310 being pushed onto the transformer 330, the transformer 330 can be able to pull selected XML input items from the data sources 310, thus mitigating problems associated with copying and transforming more input items than are desired.

The transformer 330 can, for example, make transformed XML items available to a first destination data store $320_{A1}$ (e.g., a database) through a second destination data store $320_{A2}$ (e.g., a process) and an Mth data store $320_{AM}$ (M being an integer) (e.g., a pipe) (collectively the destination data stores 320). Furthermore, the transformer 330 can selectively make the transformed XML items available to the destination data stores 320. For example, rather than one hundred percent of the transformed XML items being pushed onto the destination date store $320_{A1}$, the transformer 330 can push a subset of the transformed XML items to the destination data store $320_{A1}$. Similarly, the transformer 330 can make a subset of the transformed XML items available to be pulled into the destination data store $320_{A2}$, thus mitigating problems associated with excessive copying. The ability to provide a subset of transformed XML items facilitates implementing, for example, a pipelined architecture where transformed XML items are presented to destination data stores as they are transformed, rather than waiting for one hundred percent of the transformation to complete as is typical in conventional systems. Further, the ability to provide a subset of transformed XML items facilitates terminating transformation when a desired point has been reached. For example, a destination data source may only desire the first ten percent of the transformed XML items. Thus, the transformer 330 can be employed to transform such ten percent and then stop transformation, mitigating problems associated with conventional systems where even if ten percent were desired, one hundred percent would be provided.

Figure 4:
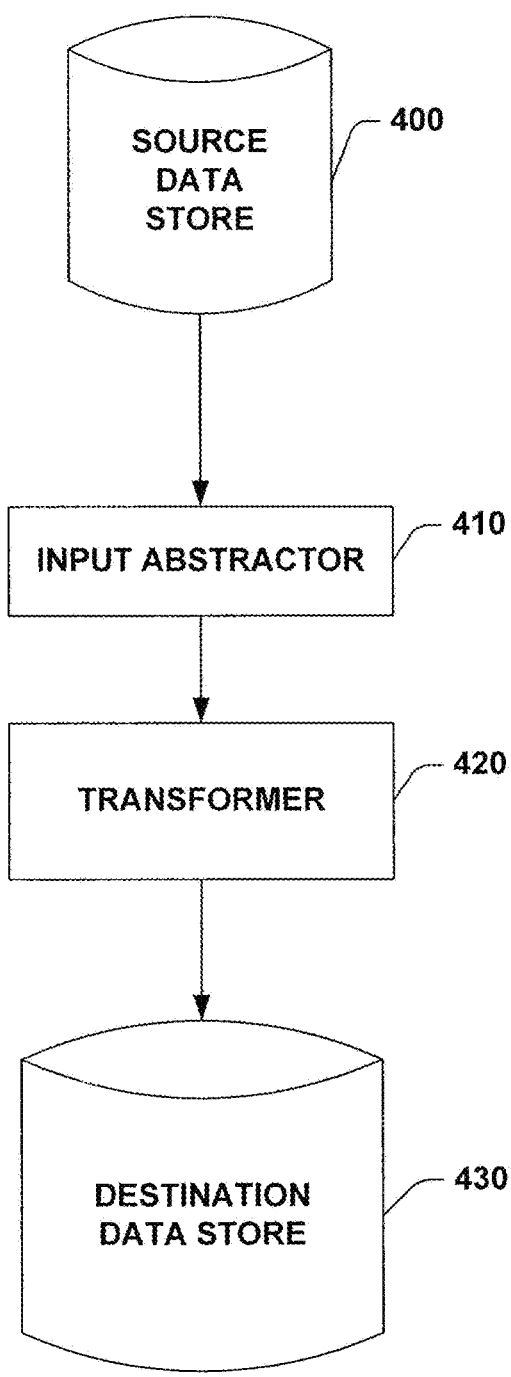
FIG. 4 is a schematic block diagram of a transformer interacting with a data source via an input abstractor, in accordance with an aspect of the present invention.

FIG. 4 illustrates a transformer 420 that is interacting with a source data store 400 via an input abstractor 410. The input abstractor 410 can be employed to make data from multiple data sources appear to have a common format. In one example of the present invention, the input abstractor exposes data from a source data store 400 according to the W3C data model and Infoset. While the example input abstractor 410 exposes the data as the W3C data model and Infoset, it is to be appreciated that an input abstractor can expose the data according to other data models and/or metadata models. The input abstractor 410 thus facilitates the transformer 420 being employed with a variety of data stores including, but not limited to, files, file systems, registries, databases, and the like.

The input abstractor 410 can be employed to make data stored in the source data store 400 appear as a stream of nodes to the transformer 420. Thus, a virtual node can be walked over the stream, which facilitates navigating the input stream of nodes. For example, input abstractor 410 cursor properties can facilitate locating a node in a stream of input nodes, moving to the next node in a stream of input nodes and moving to the previous node in a stream of input nodes. While three navigation methods are described in association with the input abstractor 410, it is to be appreciated that a greater and/or lesser number of navigation methods can be provided by an input abstractor 410. Providing the cursor model that facilitates navigating the stream of nodes facilitates selectively presenting nodes to the transformer 420 for transformation. By way of illustration and not limitation, in an environment where there are ten possible types of nodes in an input stream, the input abstractor 410 can be programmed in a first case to present a subset of three types of nodes from the input stream to the transformer 420. For example, if the source data store 400 held car sales information, the input abstractor 410 can be employed to walk a virtual node over a stream of input nodes and present to the transformer 420 only those nodes associated with the color of cars sold. Thus, precision advantages over conventional systems can be achieved which can in turn reduce processing and/or memory requirements for the transformer 420.

Sample code illustrates the definition of one sample input abstractor 410 and a program written to interact with such an input abstractor 410. One example input abstractor, an XPathNavigator, may be defined by the following code:

```
abstract class XPathNavigator : ICloneable
{
    public abstract XPathNavigator Clone( );
    // Node Properties
    public abstract XPathNodeType NodeType { get; }
    public abstract String LocalName { get; }
    public abstract String Name { get; }
    public abstract String NamespaceURI { get; }
    public abstract String Prefix { get; }
    public abstract String Value { get; }
    public abstract String BaseURI { get; }
    public abstract bool IsEmptyElement { get; }
    public abstract string XmlLang { get; }
    public abstract XmlNameTable NameTable { get; }
    // Attribute Accessors
    public abstract bool HasAttributes { get; }
    public abstract string GetAttribute(string localName,
        string namespaceURI);
    public abstract bool MoveToAttribute(string localname,
        string namespaceURI);
```

```
    public abstract bool MoveToFirstAttribute( )
    public abstract bool MoveToNextAttribute( )
    // Namespace Accessors
    public abstract string GetNamespace(string localname);
    public abstract bool MoveToNamespace(string localname);
    public abstract bool MoveToFirstNamespace( )
    public abstract bool MoveToNextNamespace( )
    // Tree Navigation
    public abstract bool MoveToNext( );
    public abstract bool MoveToPrevious( );
    public abstract bool MoveToFirst( );
    public abstract bool MoveToFirstChild( );
    public abstract bool MoveToParent( );
    public abstract void MoveToRoot( );
    public abstract bool MoveTo(XPathNavigator other);
    public abstract bool MoveToId(String id);
    public abstract bool IsSamePosition(XPathNavigator other);
    public abstract bool HasChildren { get; }
    //XPath Selections
    public abstract XPathExpression Compile(string xpathexpr);
    public virtual XPathNodeIterator Select(string xpathexpr);
    public virtual XPathNodeIterator Select(XPathExpression xpathexpr);
    public virtual object Evaluate(string xpathexpr);
    public virtual object Evaluate(XPathExpression xpathexpr);
    public virtual object Evaluate(XPathExpression xpathexpr,
        XPathIterator nodeset);
    public virtual bool Matches( string xpath );
    public virtual bool Matches( XPathExpression xpath );
    public virtual XmlNodeOrder ComparePosition( XPathNavigator
        nav );
    //XPath Optimized Selections
    public virtual XPathNodeIterator SelectChildren(string localname,
        string namespaceuri);
    public virtual XPathNodeIterator SelectChildren( XPathNodeType
        type);
    public virtual XPathNodeIterator SelectAncestors(string localname,
        string namespaceuri, bool includeSelf);
    public virtual XPathNodeIterator SelectDescendants(string localname,
        string namespaceuri, bool includeSelf);
    public virtual XPathNodeIterator SelectDescendants( XpathNodeType
        type, bool includeSelf);
    public virtual bool IsDescendant(XPathNavigator nav);
};
```

The sample input abstractor 410 supports the notion of a cursor that is positioned on a current node. When the sample input abstractor 410 properties are accessed, they return information corresponding to the current node. For example, the LocalName, NamespaceURl, Name, Prefix, and Value properties return the appropriate information for the current node.

The HasAttributes and HasChildren properties identify whether the current node has attributes or child nodes respectively. If there are attributes, they can be accessed by name through the GetAttribute method. The MoveToAttribute method facilitates moving the cursor to a specific attribute node identified by name while MoveToFirstAttribute/MoveToNextAttribute make it possible to iterate through a collection of attributes. Once positioned on an attribute node, the set of properties can then be used to access the current attribute's information. Once positioned on an attribute, returning to the element is achieved through a call to MoveToParent.

If an element node has namespace nodes, they can be accessed like attributes through the GetNamespace, MoveToNamespace, MoveToFirstNamespace, and MoveToNextNamespace methods. According to the XPath specification, elements nodes have a set of namespace nodes, one for each of the in scope namespace declarations. For namespace nodes, the Prefix property should return xmlns or the empty string if it is a default namespace declaration while the LocalName property should return the namespace prefix or xmlns if it is a default namespace declaration. The Value property should return the actual namespace name. As with attributes, call MoveToParent to move from a namespace node back to the owner element.

The set of MoveTo methods support traversing a tree. MoveToFirstChild moves the cursor to the current node's first child node. MoveToNext moves the cursor to the current node's next sibling node. MoveToPrevious does the reverse by moving the cursor to the current node's previous sibling node. MoveToFirst moves the cursor to the first sibling node in document order. MoveToParent moves the cursor up to the current node's parent node while MoveToRoot moves the cursor back to the topmost node in the tree, known as the root or document node. MoveToId moves the cursor to the element node that has an attribute of type ID with the specified value (which requires a DTD or XML Schema). MoveTo moves the cursor to the same position as that of the supplied XPathNavigator. MoveTo can be employed in combination with the Clone method, which returns a snapshot of the current XPathNavigator. This facilitates working on temporary copies of the navigator before moving the cursor. The IsSamePosition method determines whether the current navigator is at the same position as the supplied navigator.

The example input abstractor 410 base class provides an implementation of the Select method, which compiles a supplied XPath expression and returns an XPathNodeIterator reference. When a client calls XPathNodeIterator::MoveNext( ), the implementation calls into the most derived class (the class derived from XPathNavigator) to move through the tree checking for matches. Users can override the Select method and provide their own implementation of XPathNodeIterator. Thus, the present invention includes a node selection abstractor that can be employed to dynamically construct a subset of input XML items from a set of input XML items. The subset of input XML items are related items that are responsive to a query (e.g., XPath). Being able to dynamically construct a subset of input XML items that are responsive to a query facilitates mitigating problems associated with pre-computing node tree requirements for conventional queries.

Figure 21:
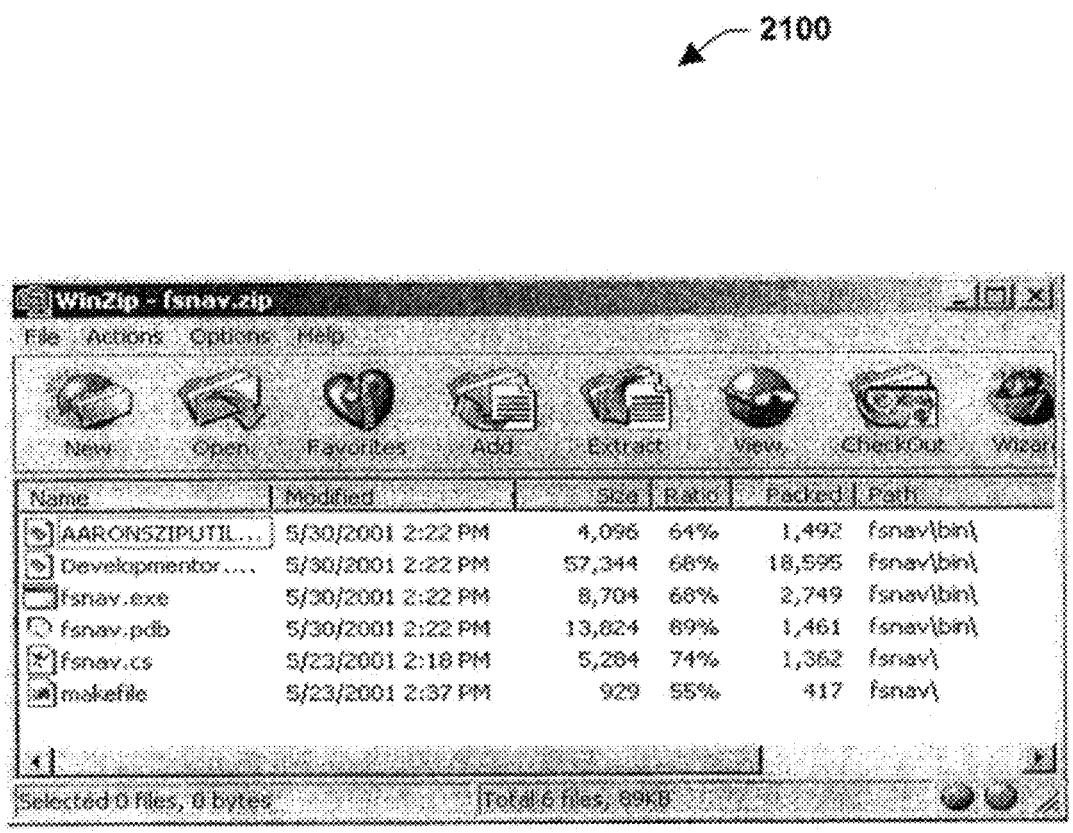
FIG. 21 is a sample screenshot of a Zip file listing.

One example input abstractor 410 is a zip file navigator that exposes a zip file as an XML document. The internal structure of a zip file is a linear list of compressed files, each of which comes with detailed information. This structure is modeled as an XML document with a top-level contents element. Inside the contents element, there is a child element for each compressed item in the zip file. Each of these elements is annotated with several attributes to describe the item in more detail (e.g., path information, compressed size, etc.). For example, FIG. 21 shows a zip file opened in WinZip and FIG. 22 shows the corresponding XML format exposed by ZipNavigator.

The following code illustrates part of a ZipState class, which keeps track of the current item in the actual zip file and how to navigate the parent and children items.

```
using System, System.IO, System.Xml, System.Xml.XPath,
System.Collections;
internal class ZipState
{
public Object currentObject;
public ZipState parent;
public int indexOfCurrentInParent;
public int indexOfAttribute;
public ZipNavigator owner;
// for other types of nodes: #document, #text
public string nonEntryName;
```

-continued

```
// attribute names
public static string[ ] atts =
{
"path",
"compressedSize",
"uncompressedSize"
};
internal ZipState( )
{
  this.indexOfCurrentInParent = −1;
  this.indexOfAttribute = −1;
  this.nonEntryName = "";
}
internal ZipState(Object current, ZipState p, int index, string neName,
  ZipNavigator nav)
{
  this.currentObject = current;
  this.parent = p;
  this.nonEntryName = neName;
  this.indexOfCurrentInParent = index;
  this.indexOfAttribute = −1;
  this.owner = nav;
}
public ZipState Clone( )
{
  ZipState astate = new ZipState( );
  astate.currentObject = this.currentObject;
  astate.nonEntryName = this.nonEntryName;
  astate.parent = this.parent;
  astate.indexOfCurrentInParent = this.indexOfCurrentInParent;
  astate.indexOfAttribute = this.indexOfAttribute;
  astate.owner = this.owner;
  return astate;
}
public ZipState OpenChild(int childIndex)
{
  ZipState ast = null;
  if (IsDocument)
  {
  if (childIndex > 0)
   return null;
  ast = new ZipState(owner.zip, this, 0,
    "contents", owner);
  }
  else if (IsAttribute)
  {
  if (childIndex > 0)
   return null;
  ast = new ZipState(null, this, 0, "#text", owner);
  }
  else if (childIndex >= 0 && childIndex<ChildCount)
  ast = new ZipState(null, this, childIndex,"",owner);
  else return null;
  return ast;
}
public string Name
{
  get
  {
  if (IsAttribute)
   return AttributeNames[indexOfAttribute];
  else if (IsZipItem)
  {
   string name = ((Lib.ZipReader)owner.zip).
   GetFileName(indexOfCurrentInParent).ToLower( );
   int index = name.LastIndexOf("\\");
   if (index >= 0)
   {
   string encName = XmlConvert.EncodeLocalName(name.-
   Substring(index+1))
   if (encName.Length == 0)
    return XmlConvert.EncodeLocalName(name.Substring(0,index));
   else
    return encName;
   }
   else
   return XmlConvert.EncodeLocalName(name);
  }
  else
```

```
    return nonEntryName;
  } }
public int ChildCount
{
get
{
if (IsDocument)
  return 1;
else if (IsDocumentElement)
  return ((Lib.ZipReader)owner.zip).GetCount( );
else if (IsAttribute)
  return 1;
else if (IsTextNode)
  return 0;
else
  return 0;
  } }
public string GetAttribute(string name)
{ if (IsZipItem)
  { ZipReader myzip = (Lib.ZipReader)owner.zip;
switch(name)
{
case "path":
  return myzip.GetFileName(indexOfCurrentInParent);
case "compressedSize":
  return myzip.GetCompressedSize(indexOfCurrentInParent).ToString( );
case "uncompressedSize":
  return myzip.
GetUncompressedSize(indexOfCurrentInParent).ToString( );
default:
  break;
}
  }
  return "";
}
```

The following code illustrates a portion of the ZipNavigator implementation and its interactions with the ZipState class.

```
using System, System.IO, System.Xml, System.Xml.XPath,
System.Collections;
public class ZipNavigator : XPathNavigator
{
private ZipState state;
private string zipFileName;
private XmlNameTable nt = new NameTable( );
public Lib.ZipReader zip;
public ZipNavigator(string zipFileName)
{
  this.zip = new Lib.ZipReader( );
  this.zipFileName = zipFileName;
  this.state = new ZipState(null, null, −1, "#document", this);
  zip.Open(zipFileName);
}
private ZipNavigator(ZipState s, Lib.ZipReader zr)
{
  this.zip = zr;
  this.state = s;
}
public override XPathNavigator Clone( )
{
  return new ZipNavigator(this.state.Clone( ), this.zip);
}
public override XPathNodeType NodeType
{
  get
  {
if (state.IsDocument)
  return XPathNodeType.Root;
  else if (state.IsAttribute)
  return XPathNodeType.Attribute;
  else if (state.IsTextNode)
  return XPathNodeType.Text;
  else
  return XPathNodeType.Element;
  } }
public override string LocalName
{ get { return nt.Add(state.Name); }}
public override string NamespaceURI
{   get { return nt.Add(string.Empty); } }
public override string Name
{  get { return nt.Add(state.Name); }}
public override string Prefix
{ get { return nt.Add(string.Empty); }}
public override bool IsEmptyElement
{
  get { if (state.IsAttribute || state.IsTextNode) return false; return
!HasChildren; }
}
public override bool HasAttributes
{ get { return AttributeCount > 0; }}
public override bool HasChildren
{ get { return (state.ChildCount > 0); }}
public override string GetAttribute(string localName, string
namespaceURI )
{
  if (namespaceURI.Equals(""))
return state.GetAttribute(localName);
  else
return "";
}
private bool UpdateState(ZipState s)
{
  if (s == null)
return false;
  else
  {
state = s;
return true;
  } }
public override bool MoveToNext( )
{
  if (state.IsAttribute)
return false;
  ZipState p = state.parent;
  if (p!=null && (IndexInParent+1 < p.ChildCount))
  {
ZipState newState = p.OpenChild(IndexInParent+1);
return UpdateState(newState);
  }
  return false;
}
public override bool MoveToPrevious( )
{
  if (state.IsAttribute)
return false;
  ZipState p = state.parent;
  if (p!=null && (IndexInParent−1 >= 0))
  {
ZipState newState = p.OpenChild(IndexInParent−1);
return UpdateState(newState);
  }
  return false;
}
public override bool MoveToFirstChild( )
{
  ZipState newState = state.OpenChild(0);
  return UpdateState(newState);
}
public override bool MoveToParent( )
{
  if (state.IsAttribute)
  { state.indexOfAttribute = −1;
return true; }
  if (state.parent != null)
  { state = state.parent;
return true; }
  return false;
}
public override void MoveToRoot( )
{
  state = new ZipState(null, null, −1, "#document", this);
}
public override bool MoveTo(XPathNavigator other)
{
```

-continued

```
    if (other is ZipNavigator)
    {
      ZipNavigator asn = (ZipNavigator)other;
      state = asn.state.Clone( );
      return true;
    }
    return false;
  }
}
```

It is to be appreciated that the sample code listed above is but one example of an input abstractor 410 and code to interact with such an abstractor 410 and that other implementations of an input abstractor 410 may be employed in accordance with the present invention.

Figure 5:
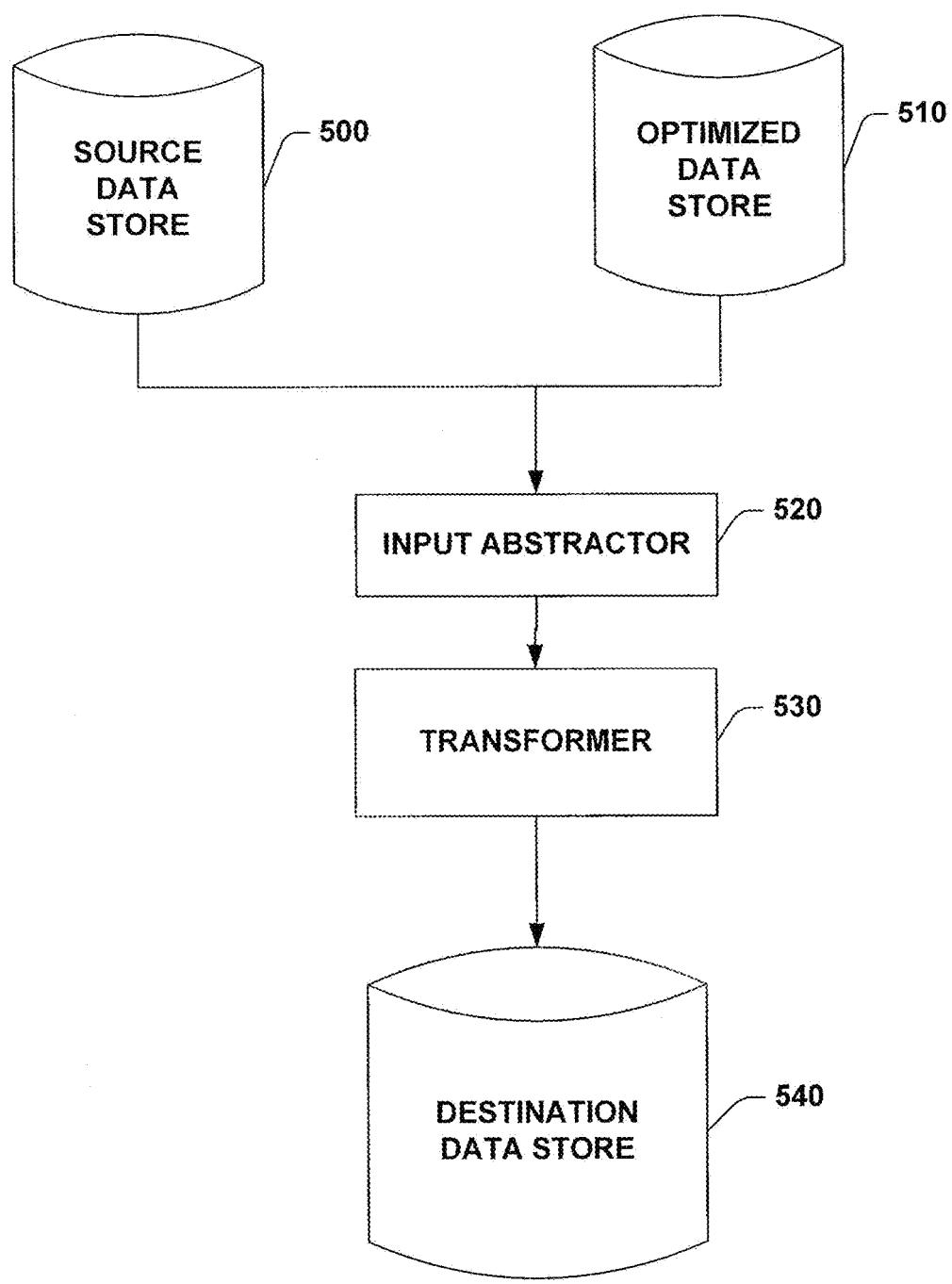
FIG. 5 is a schematic block diagram of a data source that has been optimized to interact with an XML query language, in accordance with an aspect of the present invention.
Figure 6:
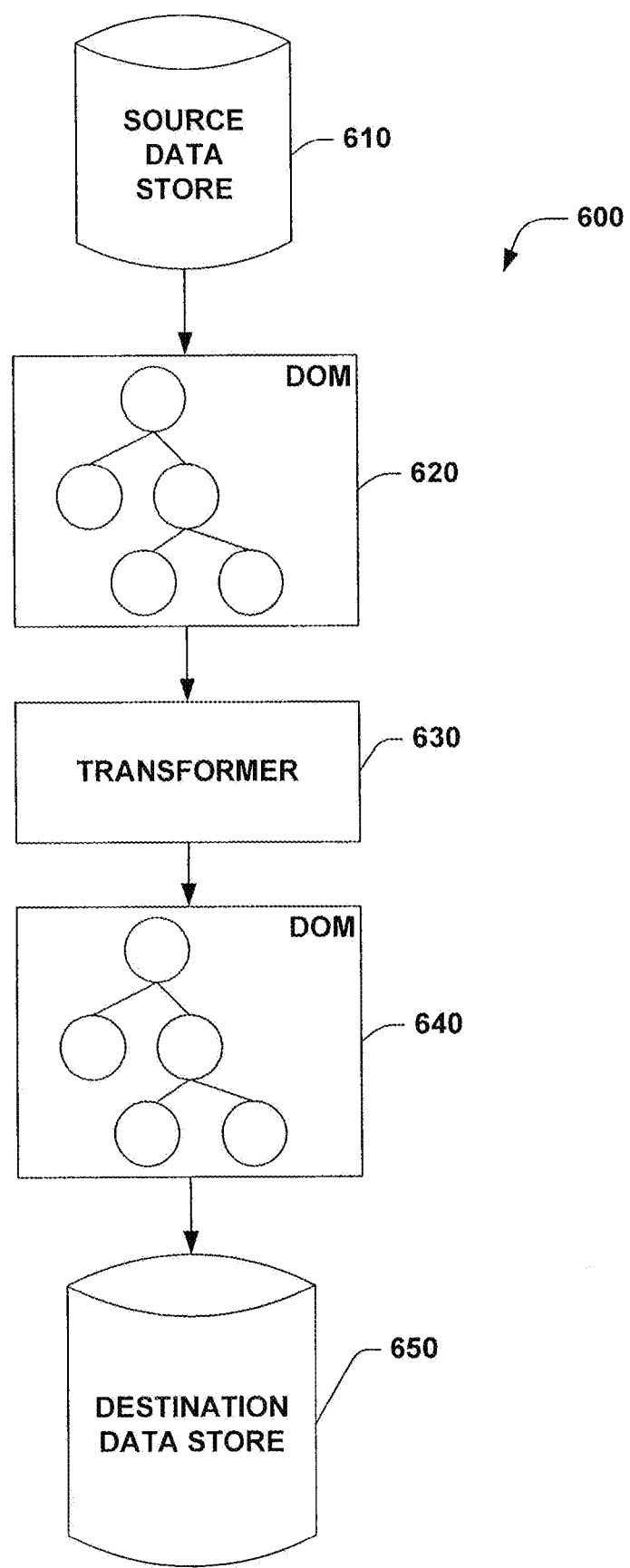
FIG. 6 is a schematic block diagram of a conventional transformation system that involves additional copying steps.

Turning now to FIG. 5, a transformer 530 is illustrated interacting with an optimized data store 510 via an input abstractor 520. Conventionally, XML data stores are not optimized for querying. Thus, when a query is made against a data store, unacceptable amounts of processing time can be consumed in responding to the query, if such response is even possible. But the present invention provides a data store 510 that is optimized to interact with the transformer 530 that can include an Xslt processor and/or XPath engine. The data store 510 stores information employed by XPath and thus performs actions including, but not limited to expanding entities, removing XML declarations, converting DOM model entities to XPath model entities and adding a namespace node that is node in the XPath model. Thus, queries can be processed more quickly than is possible in conventional systems. For example, in Prior Art FIG. 6, a system 600 employed to query a source data store 610 is illustrated. In system 600, the document in the source data store 610 can first be copied into a DOM 620 and then pushed into a transformer 630, where the entire tree can be navigated to process the query. Thus, an additional copy step and additional memory are required to process the query. Furthermore, the entire results of the query can be pushed out of the transformer 630 into a second DOM tree 640 before the transformed result of the query is pushed into a destination data store 650. Such a conventional system 600 incurs unnecessary overhead and can transform more data than is required to satisfy a query.

Figure 7:
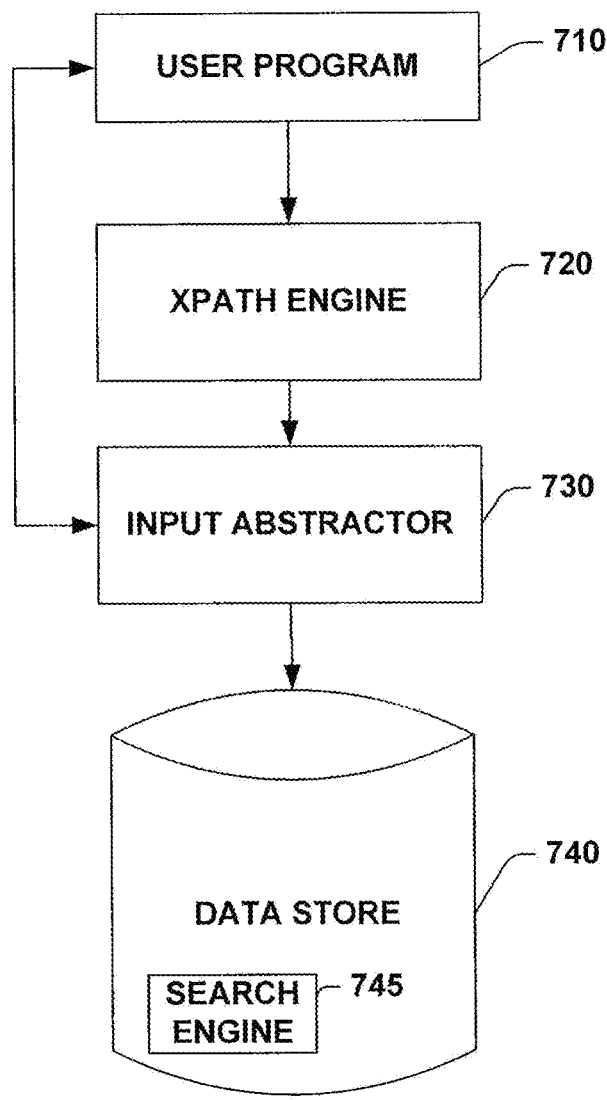
FIG. 7 is a schematic block diagram illustrating a system that supports querying a data store, where some queries are optimized for performance within the data store, in accordance with an aspect of the present invention.

FIG. 7 illustrates a data store 740 that includes a search engine 745, which facilitates optimizing some queries on a data store. A user program 710 can desire to query a node tree stored in the data store 740 that is exposed via an input abstractor 730. An XPath engine 720 can be employed to process such queries, which are facilitated by the navigation provided by the input abstractor 730. The XPath engine 720 of the present invention can, in some cases, recognize when efficient operations can be performed in the data store 740 by the search engine 745, rather than by the XPath engine 720 via the input abstractor 730. Thus, queries including, but not limited to, find descendants, find ancestors, find children, find siblings, and the like, can pass from the user program 710 to the search engine 745 where they are processed within the data store 740 providing efficiency advantages over conventional systems.

Figure 8:
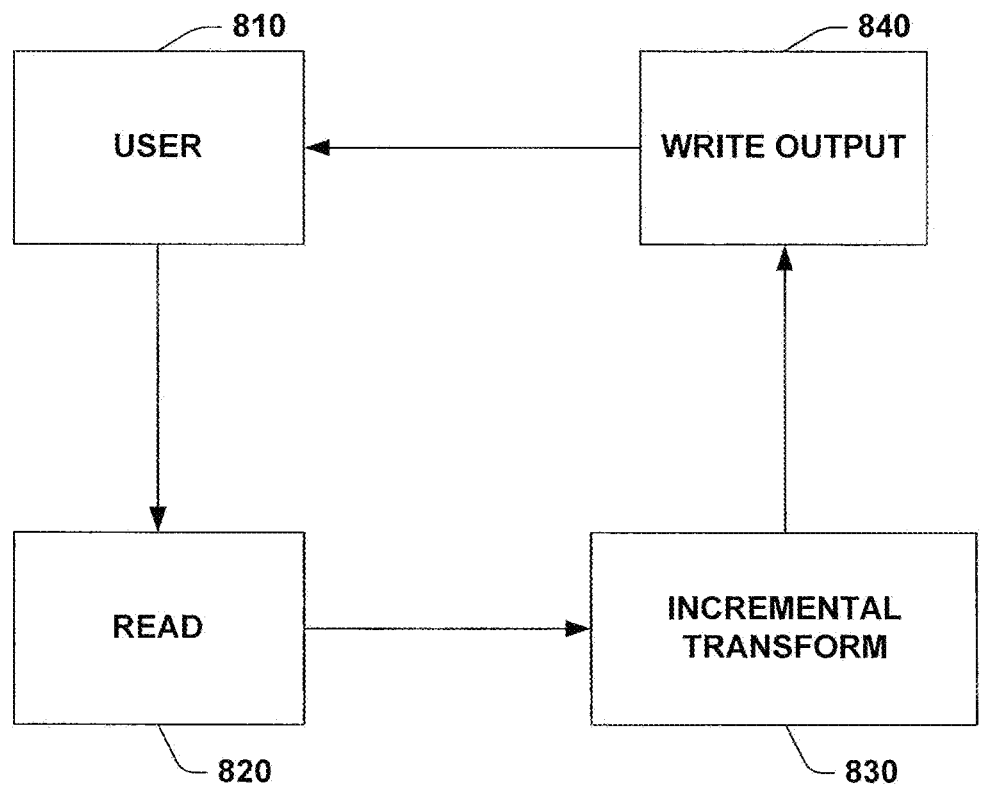
FIG. 8 is a schematic block diagram illustrating an incremental read, in accordance with an aspect of the present invention.

FIG. 8 illustrates incremental reading that is facilitated by the present invention. Conventionally, one hundred percent of a transformed XML document was pushed to a destination. The present invention facilitates an incremental stream oriented output, via either push and/or pull processing. A user 810 may desire to read one or more transformed XML items. Thus, the user 810 can create a transform object, pass it a style sheet that governs the transformations the user 810 desires and can then invoke a transformer that will be associated with a streaming reader. The user can then make one or more read calls 820. Such read calls 820 will cause an incremental transform 830 sufficient to satisfy the read. The result(s) of the incremental transform 830 can then be pushed to the user 810 via a write output 840 and/or pulled by the user 810 via the write output 840.

Figure 9:
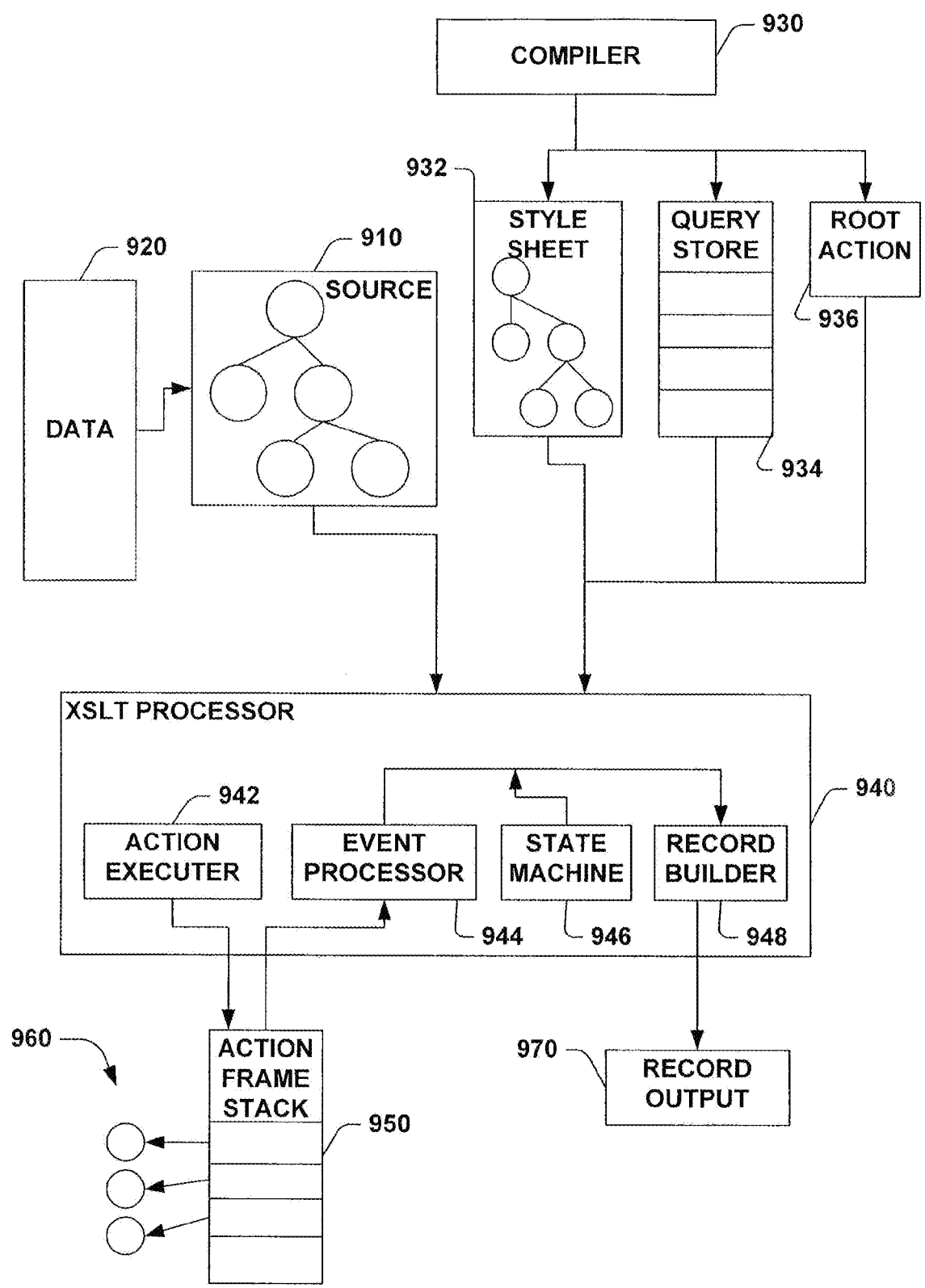
FIG. 9 is a schematic block diagram of an Xslt processor, in accordance with an aspect of the present invention.

FIG. 9 illustrates an Xslt processor 940 that can be employed to transform XML items. While the example transformation is described in connection with certain data structures (e.g., stacks, lists, linked lists, action frame stacks, query stores etc.), algorithms (e.g., recursive tree walks, cursor navigation, pushing data, pulling data) and computational models (e.g., event processing), it is to be appreciated that the transformation processes of the present invention can be practiced employing other data structures, algorithms and/or computational models. The Xslt processor 940 applies actions stored in a compiled style sheet 932, query store 934 and root action 936 (that were generated by a compiler 930) to XML items stored in a data store 920, which can be exposed to the Xslt processor 940 via an input abstractor 910. While the Xslt processor 940 does not directly output the transformed XML items, the Xslt processor 940 handles action output events and passes data associated with such action output events to a record builder 948 that constructs a record output 970. Such action output events can be the result of an action being executed by the action executer 942. The action executer 942 processes one or more actions 960 stored in an action frame stack 950, which can generate events that are handled by an event processor 944 that can pass output data to the record builder 948. The event processor 944 can query a state machine 946 to determine whether the event received is valid and whether output should be passed to the record builder 948.

The Xslt processor 940 can, for example, push the root action 936 and one or more other actions onto the action frame stack 950. When the Xslt processor 940 receives an instruction to execute an action, the action can be executed, which can in turn cause other actions to be performed. When the action frame stack 950 has no more actions 960, the transformation is substantially complete.

Turning now to compilation, FIGS. 10 through 13 describe processing associated with one example compiler. While the example compilation is described in connection with certain data structures (e.g., stacks, lists, linked lists, action frame stacks, query stores etc.), algorithms (e.g., recursive tree walks, cursor navigation, pushing data, pulling data) and computational models (e.g., event processing), it is to be appreciated that the compilation of the present invention can be practiced employing other data structures, algorithms and/or computational models.

Figure 10:
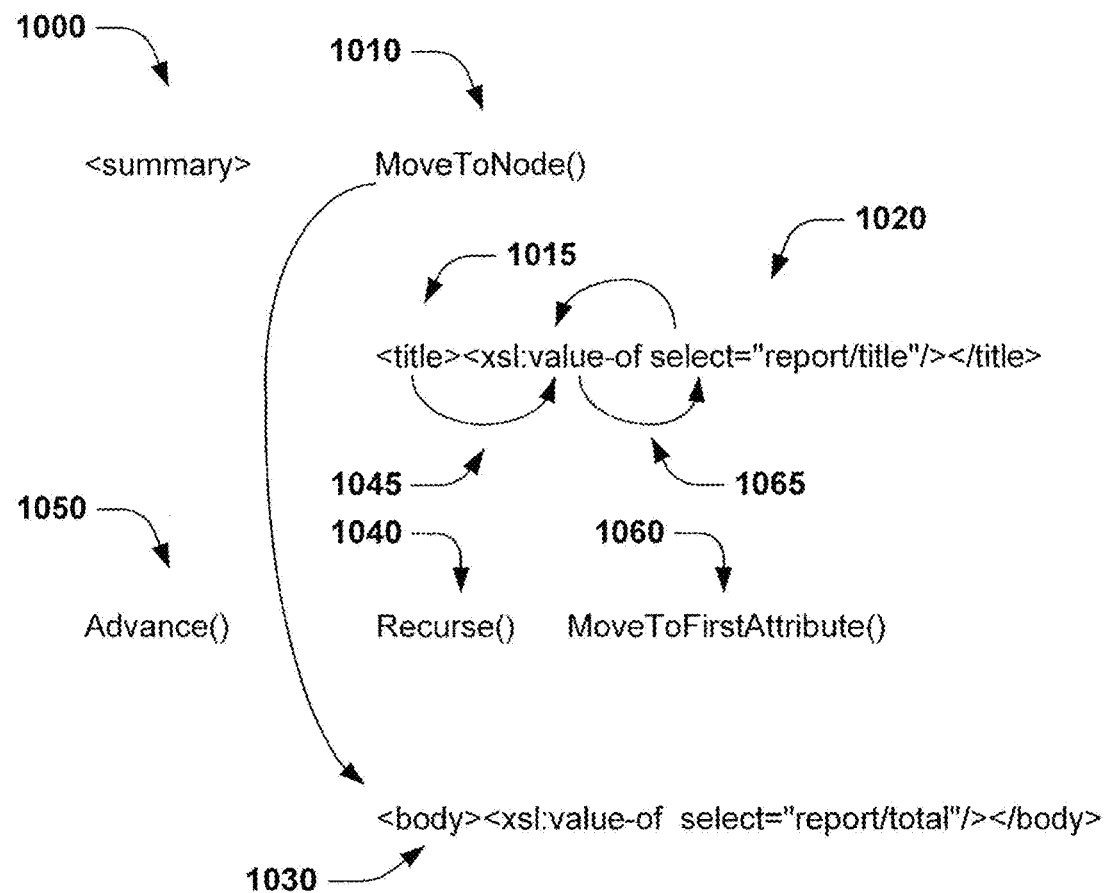
FIG. 10 illustrates processing associated with Xslt input navigation, in accordance with an aspect of the present invention.

FIG. 10 illustrates an example of navigation within a style sheet. If the current node is the element "title" 1015, then several movements are facilitated by the XsltInput navigation. The call Advance( ) 1050 will move the XsltInput to the element "body" 1030. The call Recurse( ) 1040 will move the XsltInput to the element "xsl:value-of" 1045. If the current node is the element xsl:value-of 1045, then the call MoveToFirstAttribute( ) 1060 will move the XsltInput to the attribute "select" 1065. Once the XsltInput is positioned on the attribute select 1065, a call to MoveToNode( ) will move the XsltInput back to the parent node title 1015. While seven methods and eight properties are illustrated in association with the sample XsltInput interface, it is to be appreciated that the compiler can interact with other interfaces that include a greater and/or lesser number of methods and/or properties.

Figure 11:
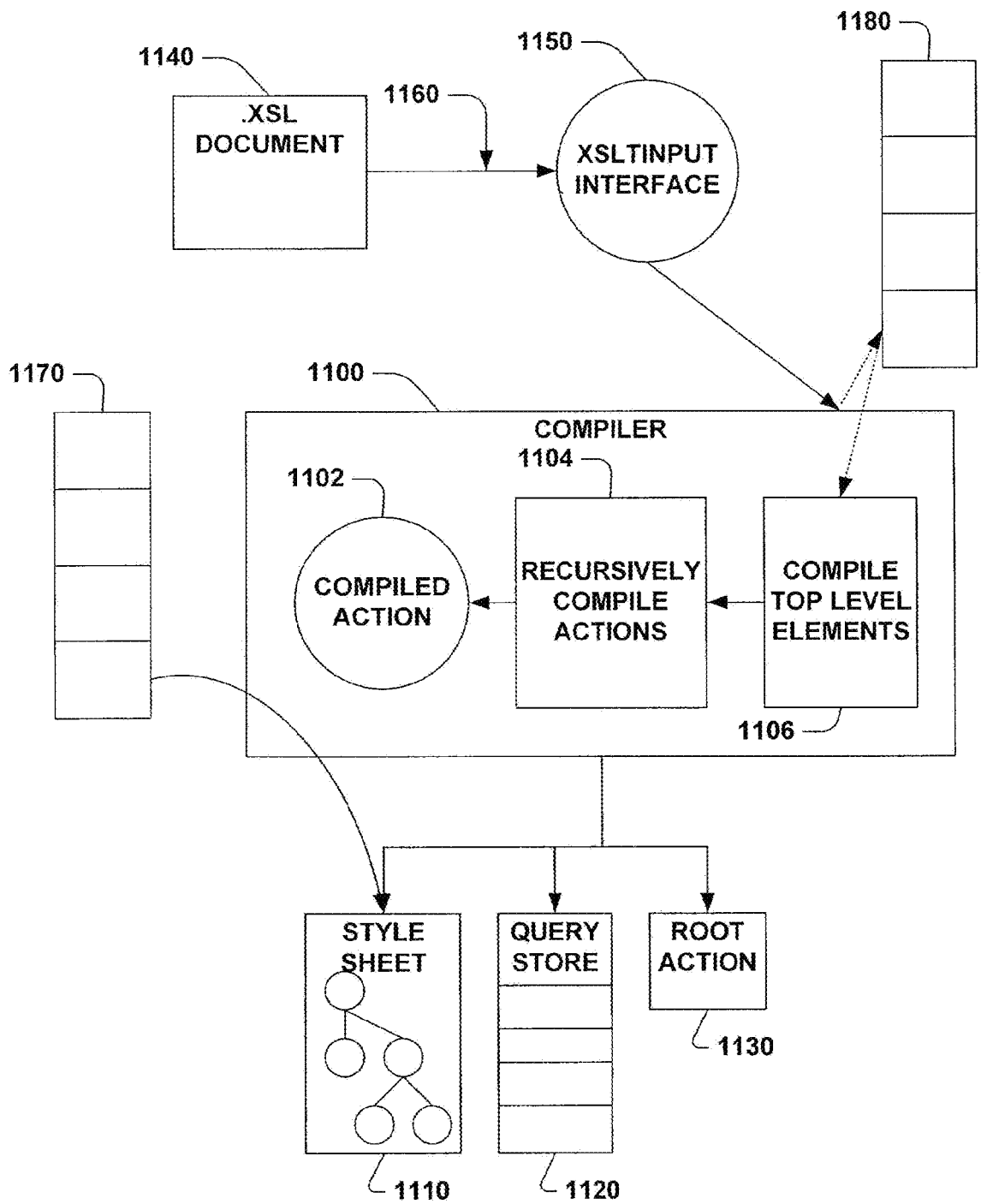
FIG. 11 illustrates processing associated with compiling a style sheet, in accordance with an aspect of the present invention.

Thus, turning to FIG. 11, the compilation phase for the example compiler begins when a Load( ) method in an XsltTransform class is called. The Load( ) method accepts the Xsl style sheet 210 (FIG. 2) containing Xslt language tags as a URL pointer and wraps the input in the XsltInput interface 1150 (FIG. 11) that allows simple navigation through the Xsl style sheet 210 (FIG. 2). The XsltInput interface 1150 (FIG. 11) contains methods for:

| | |
|---|---|
| BeginReading( ) | Called once to initialize the XsltInput class |
| Advance( ) | Moves to next sibling node |
| Recurse( ) | Moves to next child node |
| Close( ) | Cleanup for the XsltInput class |
| MoveToNode( ) | Moves to the parent node of the current node |
| MoveToFirstAttribute( ) | Moves to the first attribute of an element node |
| MoveToNextAttribute( ) | Moves to the next attribute of an element node |
| Properties | The XsltInput class contains several properties to access information from the current node. These include, but are not limited to: NodeType, Name, LocalName, NamespaceURI, Prefix, HasValue, Value, IsEmptyTag, and BaseURI |

Figure 12:
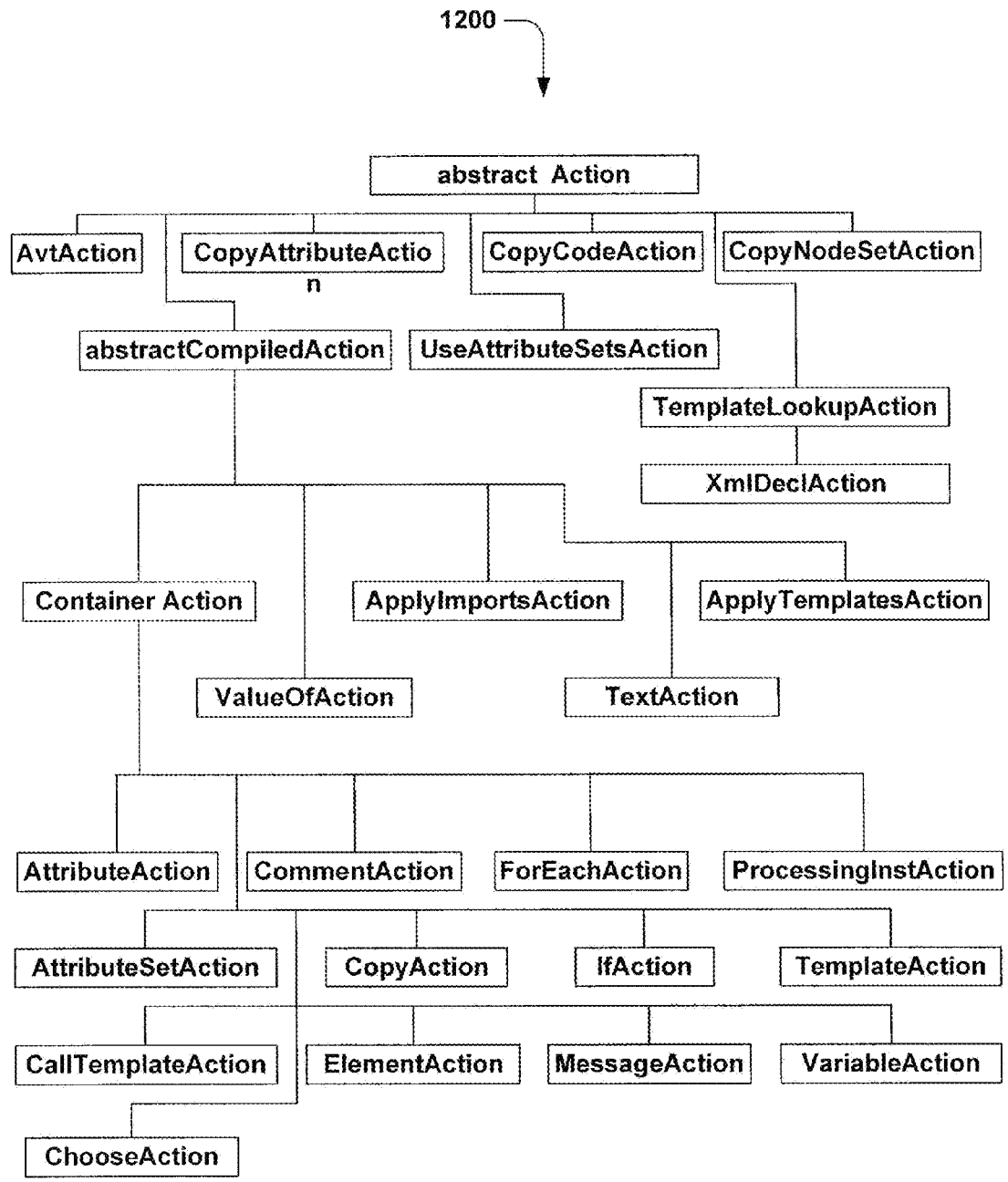
FIG. 12 illustrates an example action class hierarchy, in accordance with an aspect of the present invention.

The compiler 1100 compiles the Xsl style sheet 1140 by breaking the Xsl style sheet 1140 into actions. Actions are entities that can be executed (e.g., templates, apply-templates, value-of, if, choose, comment). Since the Xsl style sheet 1140 is well formed XML, there is a hierarchy of element tags, and there are actions for the Xslt language tags. One example action hierarchy 1200 is illustrated in FIG. 12. While the example hierarchy 1200 includes twenty-seven items organized in four layers it is to be appreciated that a greater and/or lesser number of items and/or layers can be employed in other hierarchies that can be employed in accordance with the present invention.

Actions are compiled. Such compilation can, for example, follow the sequence of: compiling attributes (storing attribute names and values in memory, adding queries to the query store); verifying attributes (ensuring required attributes are present) and recursing (if there is a body to the action, recursively compiling that body). Thus, the Xsl document 1140 can be presented via a load function 1160 to an XsltInput interface 1150 (which facilitates navigation) to the compiler 1100. The XsltInput interface 1150 and the compiler 1100 can employ an input stack 1180 to facilitate processing xsl:include and xsl:import source documents. At 1106, the compiler 1100 can compile the top-level elements presented from the Xsl document 1140 via the XsltInput interface 1150. At 1104, if the body of the top level elements require compilation, then recursion can be employed to effect such compilation and to produce one or more compiled actions 1102.

The compiler 1100 employs a style sheet stack 1170 to facilitate maintaining xsl:import precedence in building a compiled style sheet 1110 that will hold the one or more compiled actions 1102. In addition to the compiled style sheet 1110, the compiler 1100 produces a query store 1120 and a root action 1130. The query store 1120 is a key valued listing of queries in the compiled style sheet 1110. When the compiler 1100 encounters a query, the query is stored in the query store 1120 and a key to the query is returned, which facilitates conserving memory by reducing duplicate storage of duplicate queries. The root action 1130 is an action that writes an XML declaration in a transformed XML document and which initiates transformation execution by creating a template that matches "/".

Turning now to FIG. 12, a hierarchy 1200 of action classes is illustrated. By way of illustration and not limitation, a ContainerAction class can store other actions. By way of further illustration, a CopyCodeAction class can store literal element text from an Xsl style sheet.

Figure 13:
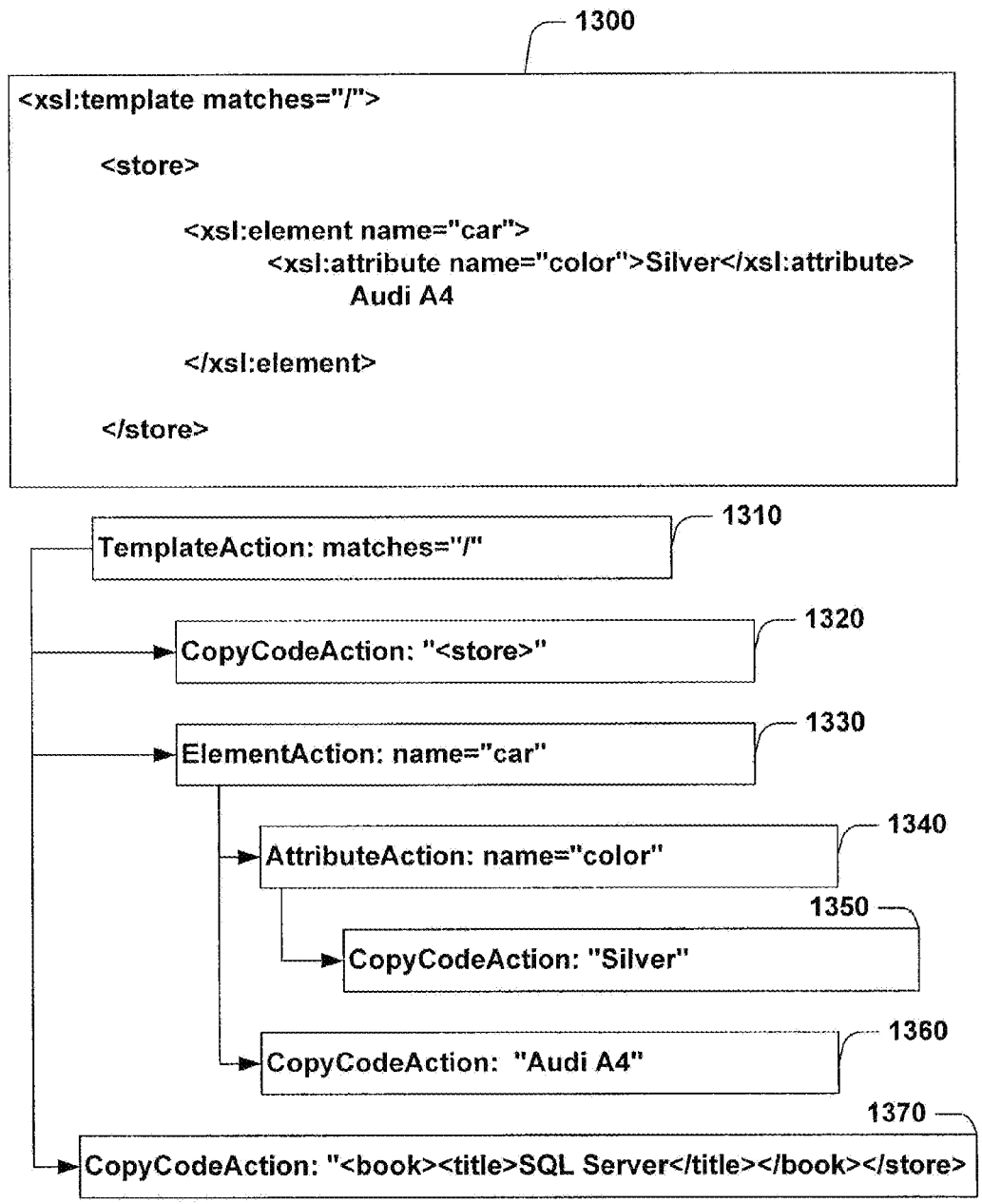
FIG. 13 illustrates Xslt source being compiled into actions, in accordance with an aspect of the present invention.

FIG. 13 illustrates a sample Xslt source 1300 being compiled into actions. The action 1310 is a TemplateAction that corresponds to the "/" in the source 1300. The action 1320 is a CopyCodeAction that corresponds to the <store> tag and which therefore stores the literal text element associated with the <store> tag. Similarly, the action 1350 is a CopyCodeAction that stores the literal text "Silver", the action 1360 is a CopyCodeAction that stores the literal text "Audi A4" and the action 1370 is a CopyCodeAction that stores the literal text "<book><title>SQL Server</title></book></store>. While the source 1300 is illustrated being compiled into eight separate actions from the action hierarchy 1200 (FIG. 12), it is to be appreciated that other compilations can produce a greater and/or lesser number of actions from one or more different action hierarchies.

Figure 14:
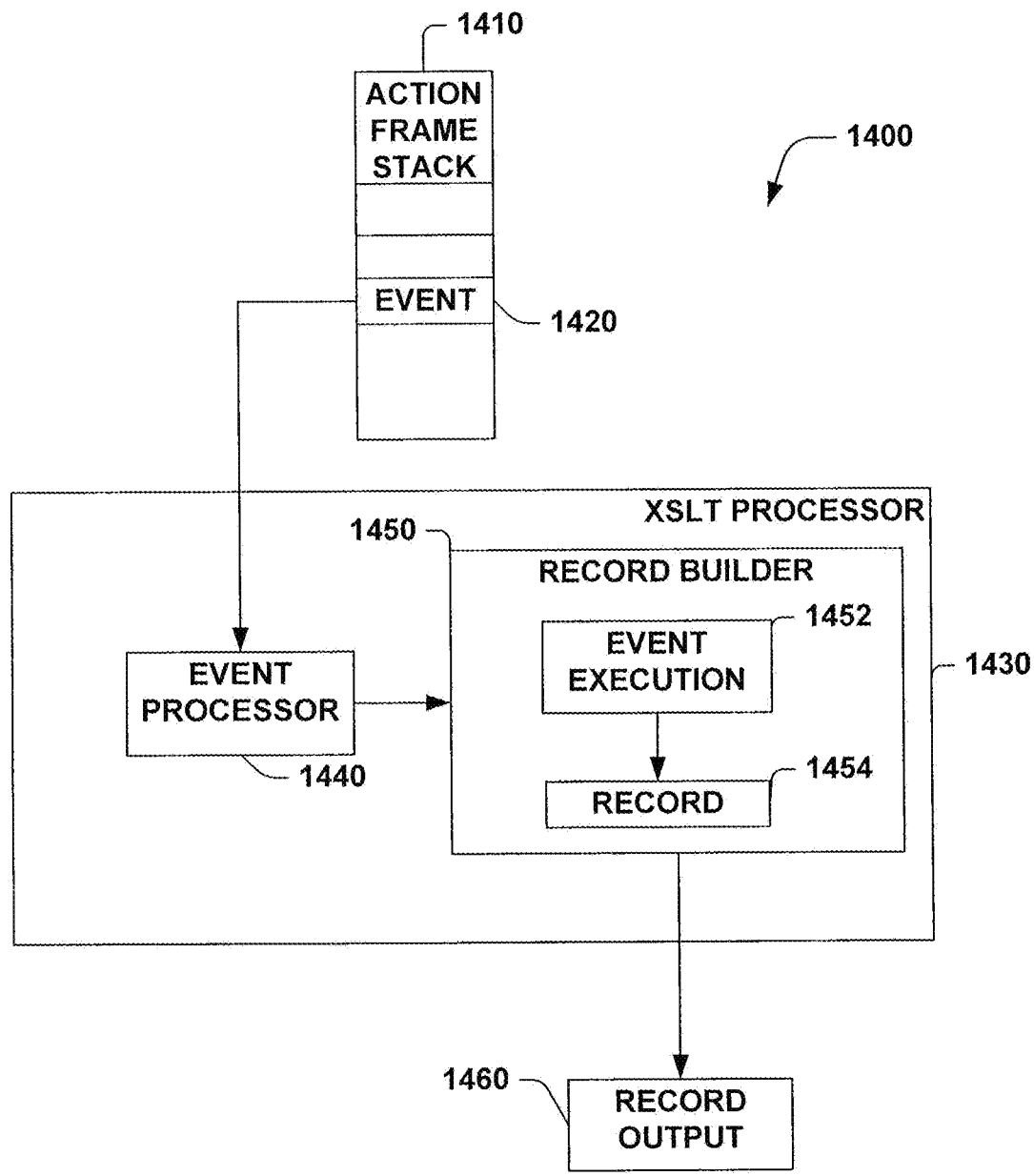
FIG. 14 illustrates event flow processing associated with building an output record, in accordance with an aspect of the present invention.

FIG. 14 illustrates a system 1400 for event handling and record building associated with transforming XML items. The system 1400 includes an Xslt processor 1430 that in turn includes an event processor 1440 and a record builder 1450. The event processor 1440 receives an event 1420 associated with processing performed in executing an action stored in an action frame stack 1410 and passes an event and related content to the record builder 1450. The record builder 1450 builds a record 1454 in which to store the content associated with the event. When the record builder 1450 receives an event it validates the content to ensure that well-formed and/or valid XML is placed in the record 1454. The record 1454 can be output to a variety of record outputs 1460 including, but not limited to, a sequential output, a reader output, a writer output and a document output, for example. Thus, the Xslt processor 1430, through the record builder 1450, facilitates incremental stream output of transformed XML items, providing advantages over conventional systems. By way of illustration and not limitation, a record output 1460 may only desire to see transformed XML items until a desired transformed item is encountered and may then desire that transformation terminate. The record level streaming output facilitated by the record builder 1450 facilitates such early termination.

In view of the exemplary systems shown and described above, methodologies that can be implemented in accordance with the present invention will be better appreciated with reference to the flow charts of FIGS. 15 through 18. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, computer executable instructions operable to perform the methods described herein may be stored on computer readable media.

Figure 15:
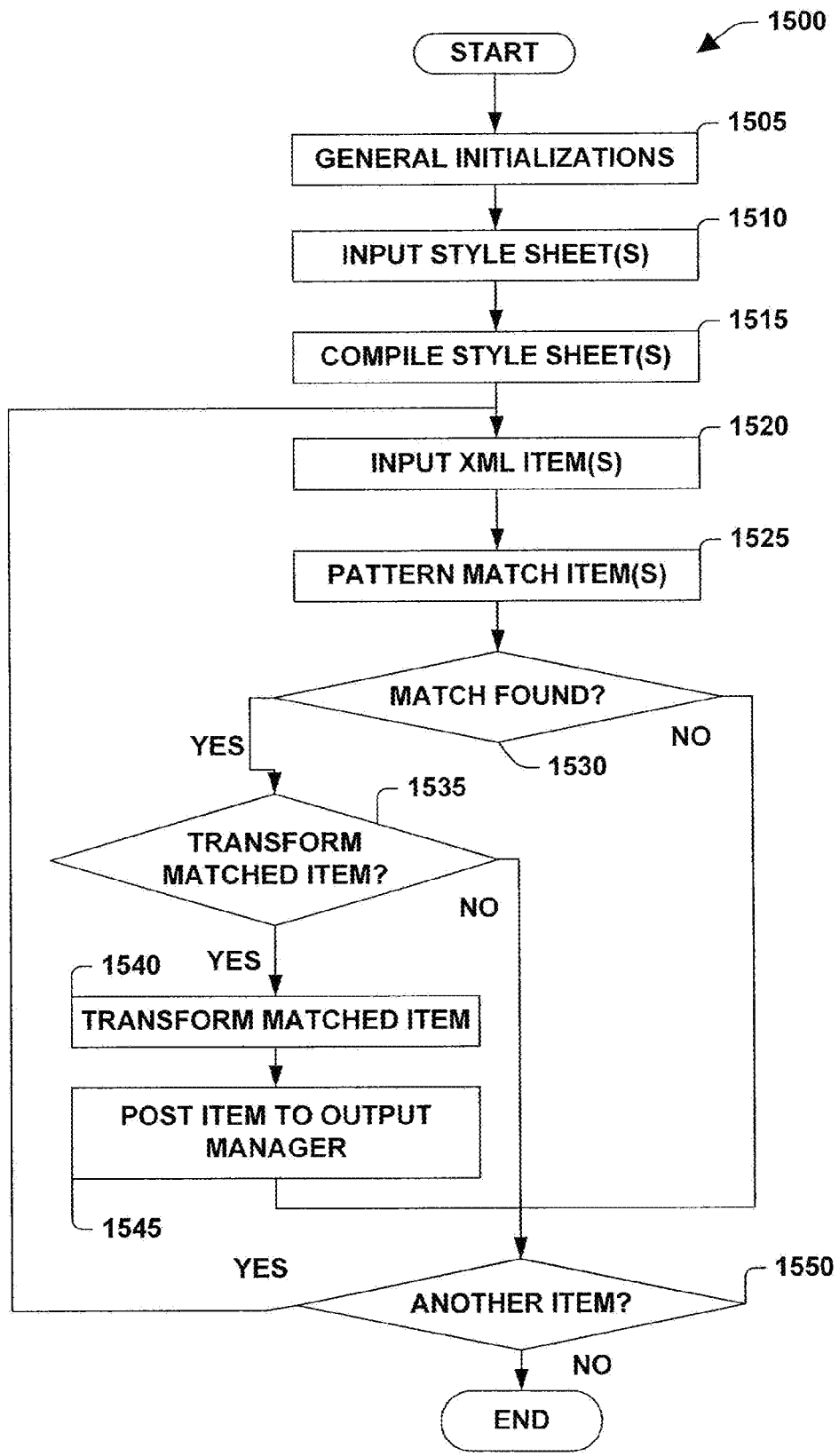
FIG. 15 is a flow chart illustrating a method for transforming XML data from one form to another, in accordance with an aspect of the present invention.

FIG. 15 illustrates a method 1500 for transforming XML data from one form to another. At 1505 general initializations occur. Such initializations include, but are not limited to, allocating memory, establishing pointers, establishing data communications, acquiring resources, instantiating objects, and setting initial values for variables. At 1510, a style sheet is input. At 1515 the style sheet is compiled, which can result in the creation of one or more actions, queries and a root action being made available to an Xslt processor. At 1520, an XML item to be transformed is input.

At 1525, the input XML item is pattern matched against one or more templates in the style sheet to determine whether the XML item has an associated transformation action. At 1530 a determination is made concerning whether there was a pattern match at 1525. If the determination at 1530 is NO, that no match was found, then processing proceeds to 1550. But if the determination at 1530 is YES, that a match was found, then at 1535 a determination is made concerning whether the XML item is an item that the user desires to have transformed. For example, although there may be a match for the item, the item may not be of interest to a user and thus the user may have programmed the method 1500 to ignore such matches.

If the determination at 1535 is NO, then processing proceeds to 1550. But if the determination at 1535 is YES, then at 1540 the XML item is transformed and at 1545 the item is posted to an output manager. At 1550, a determination is made concerning whether there is another item to be transformed. If the determination at 1550 is NO, then processing can conclude, otherwise processing returns to 1520.

Figure 16:
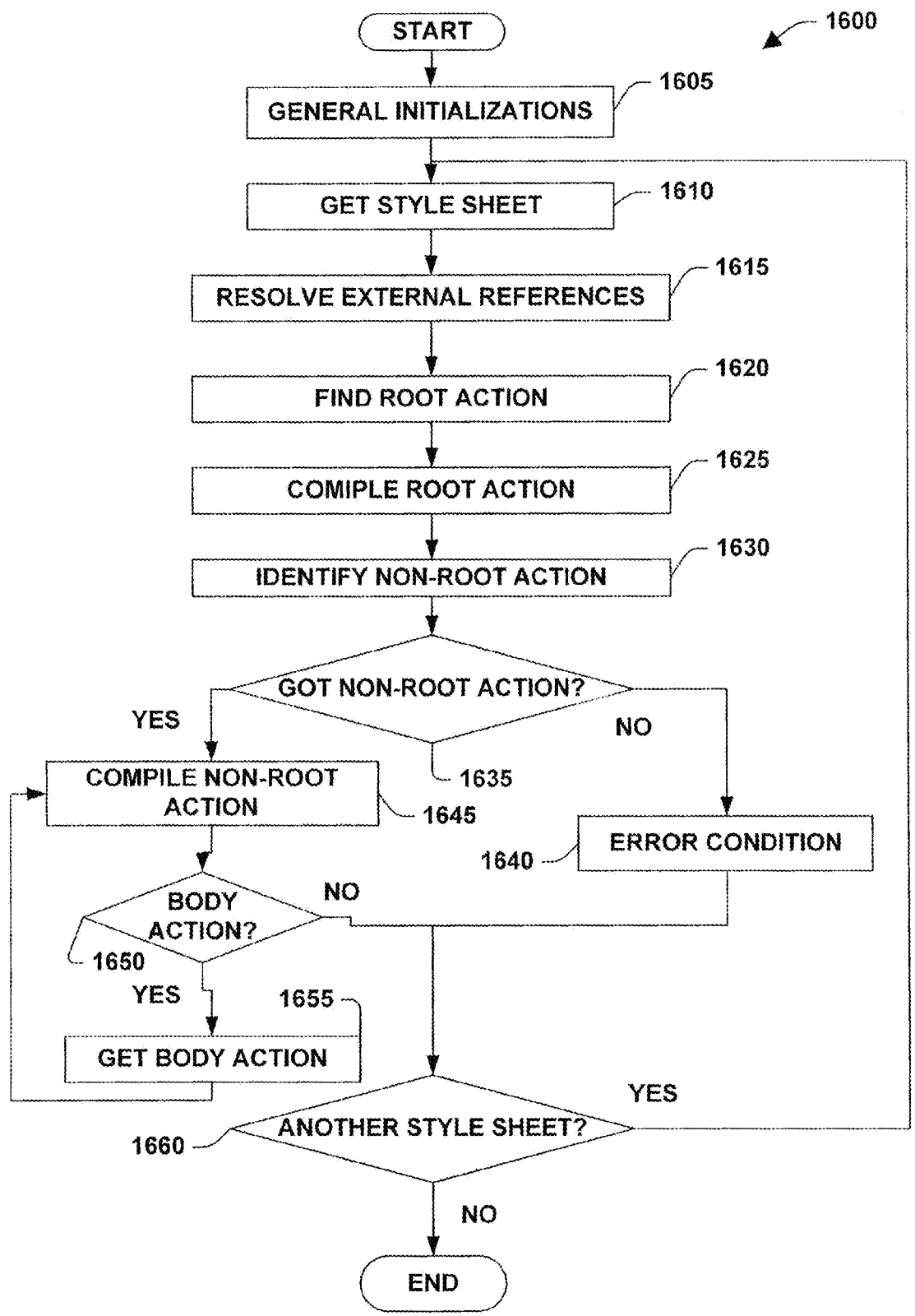
FIG. 16 is a flow chart illustrating a compilation method associated with the method for transforming XML data from one form to another, in accordance with an aspect of the present invention.

FIG. 16 illustrates a compilation method 1600 associated with the method 1500 for transforming XML data from one form to another. At 1605 general initializations occur. Such initializations include, but are not limited to, allocating memory, establishing pointers, establishing data communications, acquiring resources, instantiating objects, and setting initial values for variables. At 1610 a style sheet is input to the method 1600. A style sheet may include one or more external references. Thus, at 1615, such external references are resolved. At 1620, the root action for the style sheet is found to facilitate compiling such root action first. At 1625 the root action of 1620 is compiled. Such compilation may include compiling root attributes and/or verifying root attributes, for example. At 1630 the method 1600 attempts to identify whether the style sheet of 1610 has a non-root action since a well-formed XML document may have only a root action. At 1635, a determination is made concerning whether a non-root action was identified. If the determination at 1635 is NO, that there is not a non-root action, then at 1640 processing associated with an error condition (e.g., interrupt, signal, throw exception) may be undertaken if the style sheet 1610 has not been identified as a well formed XML document.

If the determination at 1635 is YES, then at 1645 the non-root action is compiled. Such compilation may include, but is not limited to, compiling attributes and verifying attributes. Compiling the attributes may in turn include, but is not limited to, storing one or more attributes in memory, storing one or more values in memory and adding one or more queries to a query store. While compiling the non-root action, the compiler may determine, at 1650, whether the action has a body that in turn may need compiling. If the determination at 1650 is YES, that the body has a non-root action, then the compilation steps of 1645 and 1650 may be recursively performed to compile such body.

If the determination at 1650 is NO, then processing proceeds to 1660 where a determination is made concerning whether there is another style sheet to compile. If the determination at 1660 is NO, then processing may conclude, otherwise processing may return to 1610.

Figure 17:
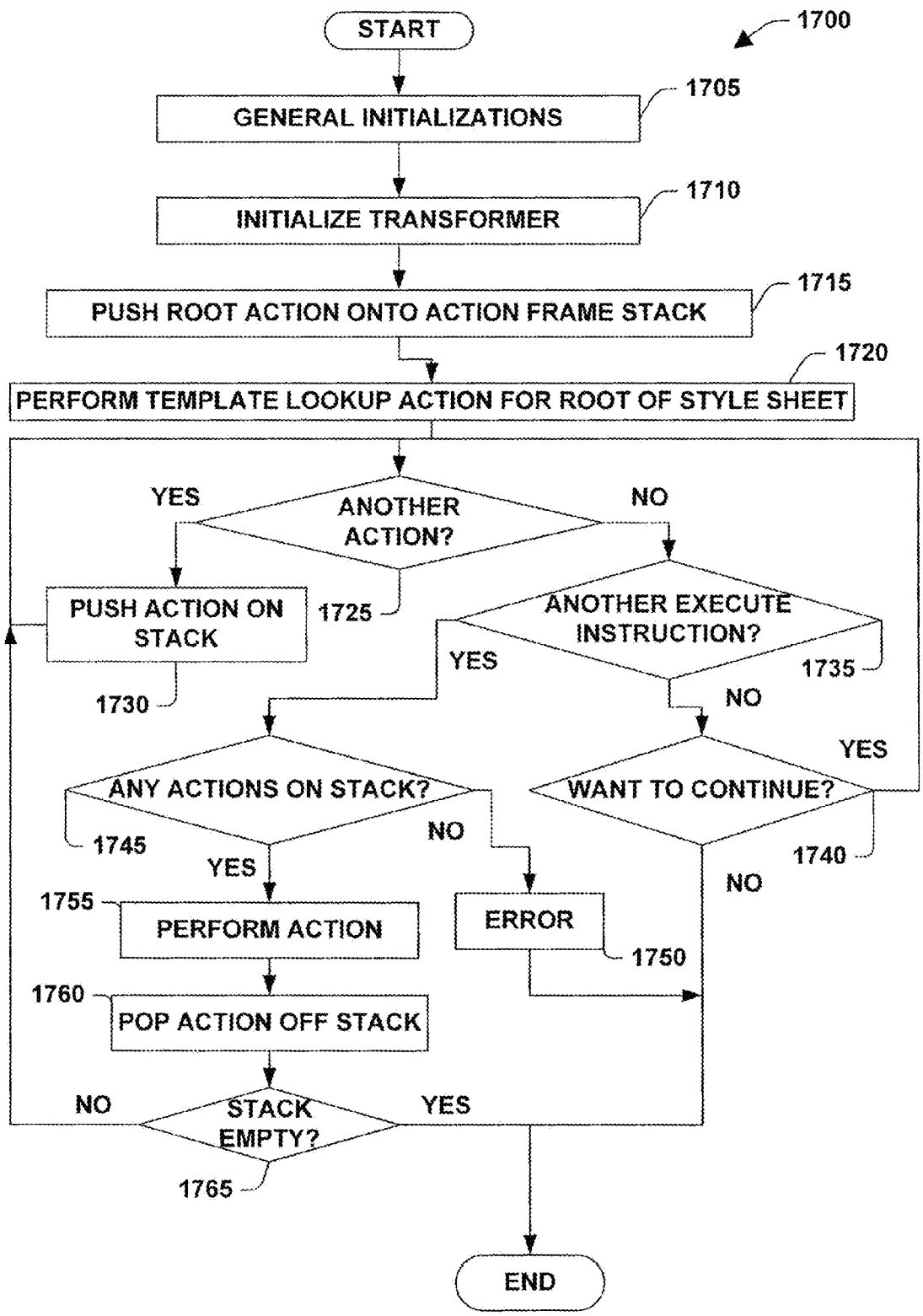
FIG. 17 is a flow chart illustrating Xslt processing and execution associated with the method for transforming XML data from one form to another, in accordance with an aspect of the present invention.

FIG. 17 illustrates an Xslt processing and execution method 1700 associated with the method 1500 for transforming XML data from one form to another. At 1705 general initializations occur. Such initializations include, but are not limited to, allocating memory, establishing pointers, establishing data communications, acquiring resources, instantiating objects, and setting initial values for variables.

At 1710 a transformer is initialized. Such initialization may include, but is not limited to allocating memory (e.g., action frame stack), establishing a state machine, establishing data communications (e.g., with compiled style sheet, with XML input data source), verifying security, authenticating users and the like. At 1715, a root action provided by the compiler is pushed onto the action frame stack. At 1720, a template lookup action for the root of the style sheet is performed. Once the root action has been processed, then a loop that looks for subsequent actions to push onto the stack frame and subsequent instructions to perform such pushed actions is initiated.

Thus, at 1725, a determination is made concerning whether another action has been acquired and should be pushed on the stack. If the determination at 1725 is YES, then at 1730, the action is pushed on the stack. But if the determination at 1725 is NO, then at 1735 a determination is made concerning whether another instruction to execute an action has arrived. If the determination at 1735 is NO, then at 1740 a determination is made concerning whether the method 1700 will continue. If the determination at 1740 is NO, then processing can conclude, otherwise processing returns to 1725. If the determination at 1735 is YES, then at 1745 a determination is made concerning whether there are any more actions on the stack to perform.

If the determination at 1745 is NO, that there are no more actions on the stack, then at 1750 processing associated with an error condition (e.g., interrupt, exception, signal, termination) may be performed and then processing may conclude or return to 1725. But if the determination at 1745 is YES, then at 1755, the action may be performed followed at 1760 by the action being popped off the stack. At 1765 at determination is made concerning whether the stack is empty. If the stack is empty, then processing can conclude, otherwise processing returns to 1725.

Figure 18:
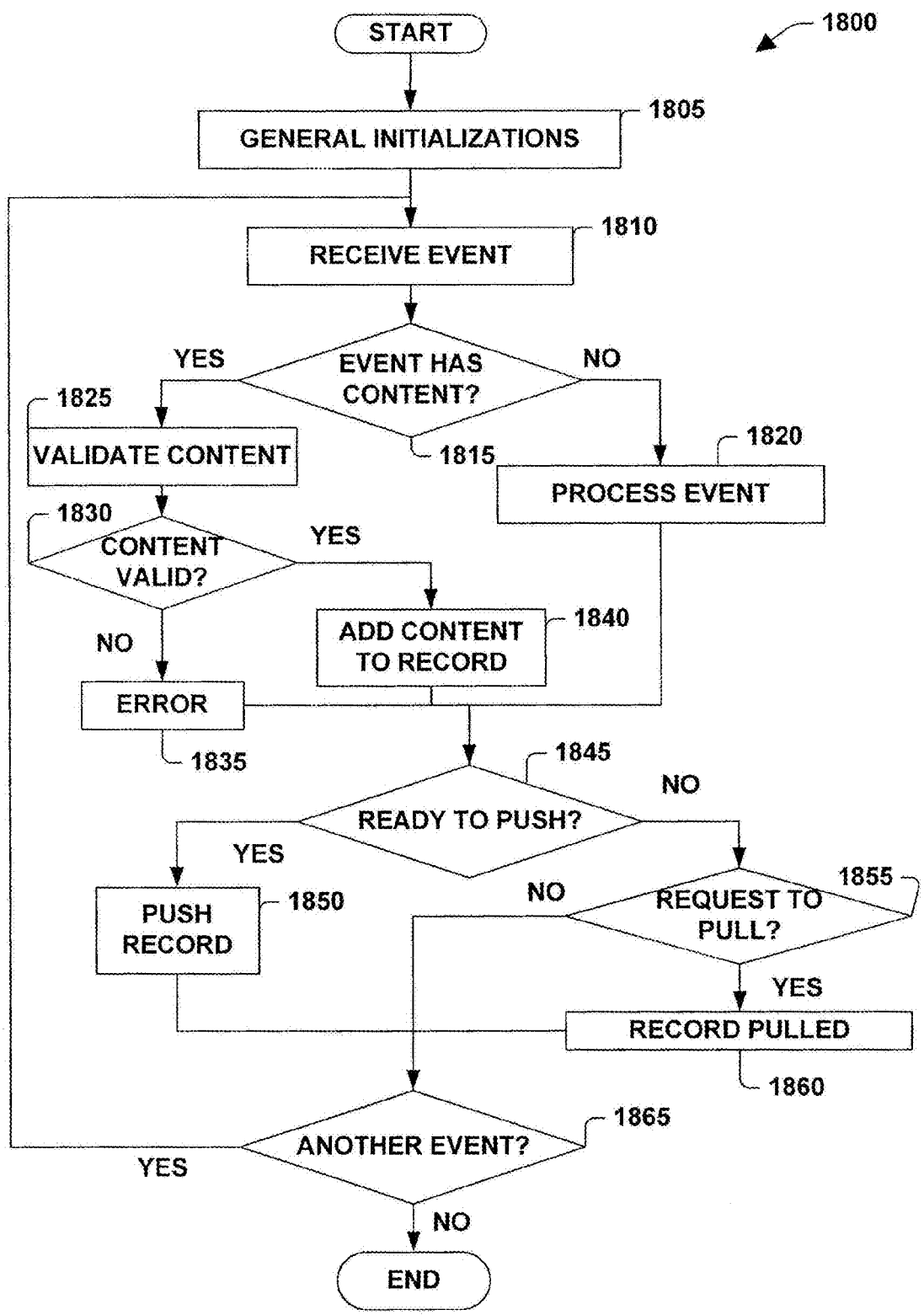
FIG. 18 is a flow chart illustrating event flow processing associated with the method for transforming XML data from one form to another, in accordance with an aspect of the present invention.

FIG. 18 illustrates an event flow processing method 1800 associated with the method 1500 for transforming XML data from one form to another. At 1805 general initializations occur. Such initializations include, but are not limited to, allocating memory, establishing pointers, establishing data communications, acquiring resources, instantiating objects, and setting initial values for variables.

At 1810 an event is received. Since an event may have associated content, at 1815 a determination is made concerning whether the event has content. If the determination at 1815 is NO, then at 1820 non-content event processing occurs. For example, a state machine may be updated. If the determination at 1815 is YES, then at 1825 the content is validated to facilitate determining whether a well-formed and/or valid transformed XML item will be produced. At 1830 a determination is made concerning whether the content is valid. If the determination at 1830 is NO, then at 1835 processing associated with an error condition may be performed (e.g., interrupt, signal, termination). But if the determination at 1830 is YES, then at 1840 the validated content is added to an output record being constructed by the method 1800.

Since the present invention facilitates providing output to a variety of output sources (e.g., push model output, pull model output), at 1845 a determination is made concerning whether the record is ready to be pushed. If the determination at 1845 is YES, then at 1850 the record may be pushed. But if the determination at 1845 is NO, then at 1855 a determination may be made concerning whether there is a request to pull the record. If the determination at 1855 is YES, then at 1860 the record can be pulled.

At 1865, a determination is made concerning whether there is another event to process. If the determination is NO, that there is not another event to process, then processing can conclude, otherwise processing can return to 1810. While method 1800 includes blocks concerning both push and pull model output, it is to be appreciated that either push and/or pull and/or other output models may be employed in accordance with the streaming output provided by the present invention.

Figure 19:
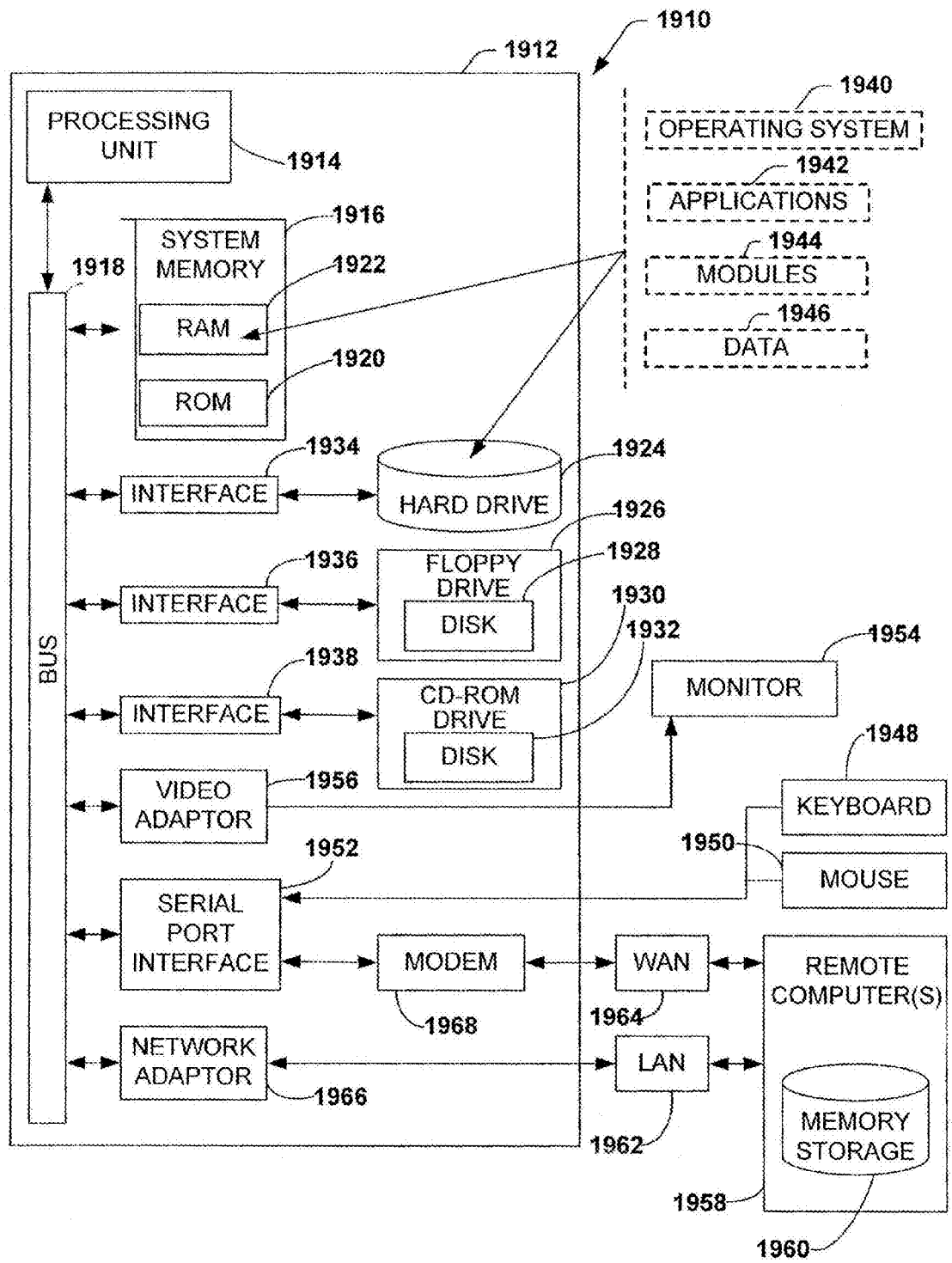
FIG. 19 is a schematic block diagram of an exemplary operating environment for a system configured in accordance with the present invention.

In order to provide additional context for various aspects of the present invention, FIG. 19 and the following discussion are intended to provide a brief, general description of one possible suitable computing environment 1910 in which the various aspects of the present invention may be implemented. It is to be appreciated that the computing environment 1910 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 19 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 19, an exemplary environment 1910 for implementing various aspects of the invention includes a computer 1912, including a processing unit 1914, a system memory 1916, and a system bus 1918 that couples various system components including the system memory to the processing unit 1914. The processing unit 1914 may be any of various commercially available processors. Dual microprocessors and other multi-processor architectures also can be used as the processing unit 1914.

The system bus 1918 may be any of several types of bus structure including a memory bus or memory controller, a peripheral bus, and a local bus using any of a variety of commercially available bus architectures. The computer memory 1916 includes read only memory (ROM) 1920 and random access memory (RAM) 1922. A basic input/output system (BIOS), containing the basic routines that help to transfer information between elements within the computer 1912, such as during start-up, is stored in ROM 1920.

The computer 1912 may further include a hard disk drive 1924, a magnetic disk drive 1926, e.g., to read from or write to a removable disk 1928, and an optical disk drive 1930, e.g., for reading a CD-ROM disk 1932 or to read from or write to other optical media. The hard disk drive 1924, magnetic disk drive 1926, and optical disk drive 1930 are connected to the system bus 1918 by a hard disk drive interface 1934, a magnetic disk drive interface 1936, and an optical drive interface 1938, respectively. The computer 1912 typically includes at least some form of computer readable media. Computer readable media can be any available media that can be accessed by the computer 1912. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1912. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1922, including an operating system 1940, one or more application programs 1942, other program modules 1944, and program non-interrupt data 1946. The operating system 1940 in the computer 1912 can be any of a number of commercially available operating systems.

A user may enter commands and information into the computer 1912 through a keyboard 1948 and a pointing device, such as a mouse 1950. Other input devices (not shown) may include a microphone, an IR remote control, a joystick, a game pad, a satellite dish, a scanner, or the like. These and other input devices are often connected to the processing unit 1914 through a serial port interface 1952 that is coupled to the system bus 1918, but may be connected by other interfaces, such as a parallel port, a game port, a universal serial bus ("USB"), an IR interface, etc. A monitor 1954, or other type of display device, is also connected to the system bus 1918 via an interface, such as a video adapter 1956. In addition to the monitor, a computer typically includes other peripheral output devices (not shown), such as speakers, printers etc.

The computer 1912 may operate in a networked environment using logical and/or physical connections to one or more remote computers, such as a remote computer(s) 1958. The remote computer(s) 1958 may be a workstation, a server computer, a router, a personal computer, microprocessor based entertainment appliance, a peer device or other common network node, and typically includes many or all of the elements described relative to the computer 1912, although, for purposes of brevity, only a memory storage device 1960 is illustrated. The logical connections depicted include a local area network (LAN) 1962 and a wide area network (WAN) 1964. Such networking environments are commonplace in offices, enterprise-wide computer networks, intranets and the Internet.

When used in a LAN networking environment, the computer 1912 is connected to the local network 1962 through a network interface or adapter 1966. When used in a WAN networking environment, the computer 1912 typically includes a modem 1968, or is connected to a communications server on the LAN, or has other means for establishing communications over the WAN 1964, such as the Internet. The modem 1968, which may be internal or external, is connected to the system bus 1918 via the serial port interface 1952. In a networked environment, program modules depicted relative to the computer 1912, or portions thereof, may be stored in the remote memory storage device 1960. It will be appreciated that the network connections shown are exemplary and other means of establishing a communications link between the computers may be used.

Figure 20:
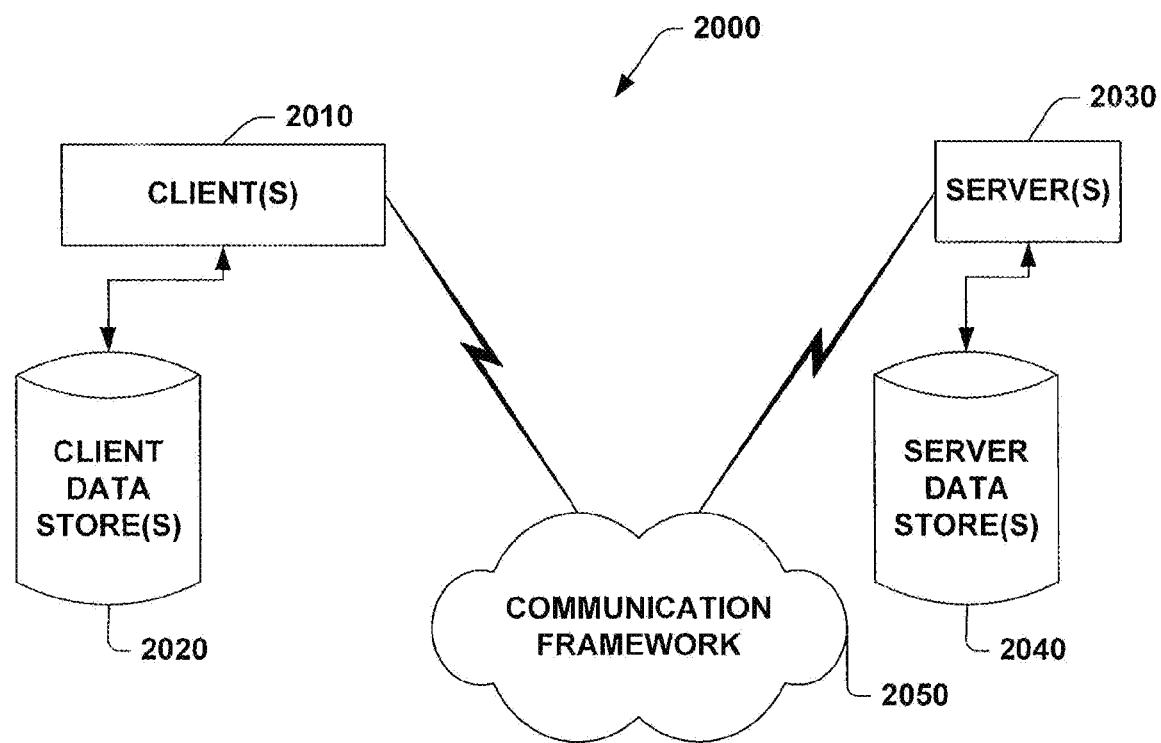
FIG. 20 is a schematic block diagram of an exemplary communication environment for a method performing in accordance with the present invention.

FIG. 20 is a schematic block diagram of a sample computing environment 2000 with which the present invention may interact. The system 2000 includes one or more clients 2010. The clients 2010 may be hardware and/or software (e.g., threads, processes, computing devices). The clients 2010 may house threads that desire to transform XML items by employing the present invention, for example. The system 2000 also includes one or more servers 2030. The servers 2030 may also be hardware and/or software (e.g., threads, processes, computing devices). The servers 2030 may house threads to perform transformations by employing the present invention, for example.

The system 2000 includes a communication framework 2050 that can be employed to facilitate communications between the clients 2010 and the servers 2030. Such a communication framework may house remoting features and/or a thread pool, for example that facilitate client/server XML transformation processing, for example. The clients 2010 are operably connected to one or more client data stores 2015 that can be employed to store information local to the clients 2010 (e.g., XML input items). Similarly, the servers 2030 are operably connected to one or more server data stores 2040 that can be employed to store information local to the servers 2030 (e.g., output destination information). The communication framework 2050 facilitates transmitting a data packet between, for example, one or more clients 2010 and one or more servers 2030. Such a data packet may include, for example, first fields that are adapted to store an input XML item in an abstracted format and second fields that are adapted to store metadata associated with the abstracted input XML item. In one example of the present invention the abstracted format conforms to the XPath specification and in another example of the present invention, the metadata exposes the W3C Infoset concerning the input XML item.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system, comprising:
   one or more processors;
   system memory; and
   one or more computer-readable storage media having stored thereon computer-executable instructions that are executable by the one or more processors to configure the computer system to selectively translate documents, the computer-executable instructions including instructions that are executable to configure the computer system to perform at least the following:
   receive an indication that identifies a percentage of a document written in a meta-markup language that is to be translated from a first format to a second, different format;
   determine which portion of the document comprises the identified percentage of the document;
   designate the determined portion of the document as a specified portion that is to be loaded into the system memory for translation, the specified portion comprising less than an entirety of the document;
   load the specified portion of the document into the system memory, wherein at least a subset of an unspecified portion of the document remains unloaded into the system memory;
   translate at least a subset of the loaded portion of the document from the first format to the second, different format; and
   provide at least a subset of the translated subset of the specified portion of the document for consumption by one or more entities, wherein at least a subset of unspecified portions of the document remains untranslated and unloaded into the system memory.

2. The computer system of claim 1, wherein the specified portion of the document comprises a portion of the document that satisfies a query.

3. The computer system of claim 1, wherein the specified portion of the document corresponds to an indication of a portion of the document that is currently being read by a user.

4. The computer system of claim 1, wherein the document comprises an extensible markup language (XML) document.

5. The computer system of claim 4, wherein the XML document is provided to one or more entities including at least one of a user, a software application, a software application user interface and a data store.

6. The computer system of claim 5, wherein the XML document is stored in one or more different data representations.

7. The computer system of claim 6, wherein the one or more different data representations are normalized to a common data representation that exposes at least one of a data model and an XML information set.

8. The computer system of claim 4, wherein the XML document is translated using an extensible stylesheet language (XSL) transformation.

9. The computer system of claim 1, wherein providing at least the subset of the translated subset of the specified portion of the document comprises pushing the provided subset to a specified destination.

10. The computer system of claim 1, wherein providing at least the subset of the translated subset of the specified portion of the document comprises making the provided subset available for selective pulling by an entity.

11. A method, implemented at a computer system that includes at least one processor and a system memory, for selectively translating a document, the method comprising:
the processor loading a specified portion of a document written in a meta-markup language into the system memory, the specified portion comprising less than an entirety of the document, wherein at least a subset of an unspecified portion of the document remains unloaded into the system memory, and wherein the specified portion of the document is incrementally loaded from a data store using a data abstractor that abstracts documents stored in a plurality of representations, allowing the documents stored in the plurality of representations to be accessed as though the documents were stored in a standard representation;
translating at least a subset of the loaded portion of the document from a first format to a second, different format; and
providing at least a subset of the translated subset of the specified portion of the document for consumption by one or more entities, wherein at least a subset of unspecified portions of the document remains untranslated and unloaded into the system memory.

12. The method of claim 11, further comprising:
receiving a query for data that is included in the document;
determining which portion of the document includes the data specified in the query; and
designating the determined portion of the document as the specified portion that is loaded into the system memory for translation.

13. The method of claim 11, further comprising:
receiving an indication that identifies a percentage of the document that is to be translated from the first format to the second, different format;
determining which portion of the document comprises the identified percentage of the document; and
designating the determined portion of the document as the specified portion that is loaded into the system memory for translation.

14. The method of claim 11, further comprising:
receiving an indication that identifies a portion of the document that is to be read by a user; and
designating the identified portion of the document as the specified portion that is loaded into the system memory for translation.

15. The method of claim 14, further comprising:
receiving one or more subsequent indications that identify subsequent portions of the document that are to be read by a user; and
designating the subsequently identified portions of the document as specified portions that are loaded into the system memory for translation.

16. A computer program product comprising one or more hardware storage devices having stored thereon computer-executable instructions that are executable by one or more processors of a computer system to configure the computing system to selectively translate documents, the computer-executable instructions including instructions that are executable to configure the computer system to perform at least the following:
load a specified portion of a document written in a meta-markup language into the system memory, the specified portion comprising less than an entirety of the document, wherein at least a subset of an unspecified portion of the document remains unloaded into the system memory, and wherein the specified portion of the document is incrementally loaded from a data store using a data abstractor that abstracts documents stored in a plurality of representations, allowing the documents stored in the plurality of representations to be accessed as though the documents were stored in a standard representation;
translate at least a subset of the loaded portion of the document from a first format to a second, different format; and
provide at least a subset of the translated subset of the specified portion of the document for consumption by one or more entities, wherein at least a subset of unspecified portions of the document remains untranslated and unloaded into the system memory.

17. The computer program product of claim 16, wherein the translated subset of the document is provided to a specified data store as it is translated.

18. The computer program product of claim 16, wherein translation of the document is terminated during translation of the specified portion of the document.

* * * * *